United States Patent
Fujimoto et al.

(10) Patent No.: US 8,290,656 B2
(45) Date of Patent: Oct. 16, 2012

(54) CONTROLLER AND CONTROLLING METHOD OF ELECTRIC VEHICLE

(75) Inventors: Satoru Fujimoto, Kawasaki (JP); Takaaki Karikomi, Sagamihara (JP); Hiroyuki Ashizawa, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 330 days.

(21) Appl. No.: 12/785,687

(22) Filed: May 24, 2010

(65) Prior Publication Data

US 2010/0299011 A1 Nov. 25, 2010

(30) Foreign Application Priority Data

May 25, 2009 (JP) .................. 2009-125463
Jun. 9, 2009 (JP) .................. 2009-138484

(51) Int. Cl.
*B60L 11/00* (2006.01)
*F16F 11/00* (2006.01)
(52) U.S. Cl. ..................... 701/22; 188/381
(58) Field of Classification Search ........... 701/22, 701/33.1, 33.7–33.9; 318/451, 611, 623, 318/689, 702, 801, 807; 301/6.91; 180/381; 188/378–379, 381
See application file for complete search history.

(56) References Cited

U.S. PATENT DOCUMENTS

| | | | |
|---|---|---|---|
| 6,351,096 B1* | 2/2002 | Jang | .............. 318/811 |
| 6,756,758 B2 | 6/2004 | Karikomi et al. | |
| 6,806,667 B1 | 10/2004 | Sasaki et al. | |
| 2002/0190683 A1 | 12/2002 | Karikomi et al. | |
| 2009/0000857 A1* | 1/2009 | Sugiyama et al. | .............. 180/444 |

FOREIGN PATENT DOCUMENTS

JP 2003-009566 A 1/2003

OTHER PUBLICATIONS

Takaaki Karikomi et al., "Development of the Shaking Vibration Control for Electric Vehicles", *SICE-ICASE International Joint Conference*, Oct. 2006, pp. 2434-2439.

* cited by examiner

*Primary Examiner* — Mary Cheung
(74) *Attorney, Agent, or Firm* — Foley & Lardner LLP

(57) ABSTRACT

A controller of electric vehicle includes: sensor sensing vehicle information; torque target value setter; torque command value calculator; first paragraph calculator implementing first filtering treatment of the torque command value, the first filtering treatment including transmission characteristic having hand pass filter characteristic; second paragraph calculator implementing second filtering treatment of motor revolution speed which is one of pieces of the vehicle information, the second filtering treatment including: the transmission characteristic having band pass filter characteristic, and model of a transmission characteristic between: torque input to the vehicle, and the motor revolution speed; torque target value calculator calculating the second torque target value. Based on the first torque target value and the second torque target value, the torque command value calculator calculates the torque command value. In the second filtering treatment, the second paragraph calculator uses attenuation coefficient which is larger than identification value of the model of the transmission characteristic.

14 Claims, 25 Drawing Sheets

CONTROLLER AND CONTROLLING METHOD OF ELECTRIC VEHICLE

BACKGROUND OF THE INVENTION

1. Field of the Invention

The present invention relates to a controller and a controlling method of an electric vehicle.

2. Description of the Related Art

Japanese Patent Unexamined Publication No. 2003-9566 (JP2003009566: equivalent of US2002190683) discloses a controller of a vehicle using an electric motor. For making a vibration damping control, this controller includes a control block having a transmission characteristic expressed by Gp(s), a subtractor for obtaining a deviation between the control block's output and a motor revolution speed, and a control block having a transmission characteristic expressed by H(s)/Gp(s). In this case, the difference between the denominator order of H(s) and the numerator order of H(s) is so set as to be more than or equal to the difference between the denominator order of Gp(s) and the numerator order of Gp(s). With this, an effect of vibration damping can be brought about even when an accelerator is stepped down from a stop state or a deceleration state.

According to the method disclosed in JP2003009566, the vehicle's torsional vibration characteristic which is to be controlled is defined as an identification model Gp(s). In this case, a torque target value and the like for determining a torque command value relative to a motor is calculated by using a filter having the transmission characteristic expressed by H(s)/Gp(s) which uses Gp(s). As such, when the vehicle's transmission characteristic is deviated from the identification model Gp(s), a vibration may occur to an output torque (feedback torque) according to a resonant characteristic of 1/Gp(s).

SUMMARY OF THE INVENTION

In view of the above, it is an object of the present invention to provide a controller of an electric vehicle, which controller is capable of preventing occurrence of a torque vibration while bringing about an effect of vibration damping.

According to a first aspect of the present invention, there is provided a controller of an electric vehicle having as a power source an electric motor driven based on a torque command value, the controller comprising: a sensor for sensing vehicle information; a torque target value setter for setting a first torque target value based on the vehicle information; a torque command value calculator for calculating the torque command value to the electric motor; a first paragraph calculator for calculating a first paragraph of a second torque target value by implementing a first filtering treatment of the torque command value, the first filtering treatment including a transmission characteristic having a band pass filter characteristic; a second paragraph calculator for calculating a second paragraph of the second torque target value by implementing a second filtering treatment of a motor revolution speed which is one of pieces of the vehicle information, the second filtering treatment including: the transmission characteristic having the band pass filter characteristic, and a model of a transmission characteristic between: a torque input to the vehicle, and the motor revolution speed; a torque target value calculator for calculating the second torque target value based on a deviation between: the first paragraph of the second torque target value, and the second paragraph of the second torque target value, wherein based on the first torque target value and the second torque target value, the torque command value calculator calculates the torque command value, and in the second filtering treatment, the second paragraph calculator uses an attenuation coefficient which is set larger than an identification value of the model of the transmission characteristic.

According to a second aspect of the present invention, there is provided a method of controlling an electric vehicle having as a power source an electric motor driven based on a torque command value, the controlling method comprising: sensing vehicle information; setting a first torque target value based on the vehicle information; calculating the torque command value to the electric motor; calculating a first paragraph of a second torque target value by implementing a first filtering treatment of the torque command value, the first filtering treatment including a transmission characteristic having a band pass filter characteristic; calculating a second paragraph of the second torque target value by implementing a second filtering treatment of a motor revolution speed which is one of pieces of the vehicle information, the second filtering treatment including: the transmission characteristic having the band pass filter characteristic, and a model of a transmission characteristic between: a torque input to the vehicle, and the motor revolution speed; calculating the second torque target value based on a deviation between: the first paragraph of the second torque target value, and the second paragraph of the second torque target value, wherein based on the first torque target value and the second torque target value, the torque command value calculating operation calculates the torque command value, and in the second filtering treatment, the second paragraph calculating operation uses an attenuation coefficient which is set larger than an identification value of the model of the transmission characteristic.

According to a third aspect of the present invention, there is provided a controller of an electric vehicle having as a power source an electric motor driven based on a torque command value, the controller comprising: a sensing means for sensing vehicle information; a torque target value setting means for setting a first torque target value based on the vehicle information; a torque command value calculating means for calculating the torque command value to the electric motor; a first paragraph calculating means for calculating a first paragraph of a second torque target value by implementing a first filtering treatment of the torque command value, the first filtering treatment including a transmission characteristic having a band pass filter characteristic; a second paragraph calculating means for calculating a second paragraph of the second torque target value by implementing a second filtering treatment of a motor revolution speed which is one of pieces of the vehicle information, the second filtering treatment including: the transmission characteristic having the band pass filter characteristic, and a model of a transmission characteristic between: a torque input to the vehicle, and the motor revolution speed; a torque target value calculating means for calculating the second torque target value based on a deviation between: the first paragraph of the second torque target value, and the second paragraph of the second torque target value, wherein based on the first torque target value and the second torque target value, the torque command value calculating means calculates the torque command value, and in the second filtering treatment, the second paragraph calculating means uses an attenuation coefficient which is set larger than an identification value of the model of the transmission characteristic.

According to a fourth aspect of the present invention, there is provided a controller of an electric vehicle having as a power source an electric motor driven based on a torque command value, the controller comprising: a sensor for sensing vehicle information; a torque target value setter for setting a first torque target value based on the vehicle information; a torque command value calculator for calculating the torque command value to the electric motor; a first paragraph calculator for calculating a first paragraph of a second torque target value by implementing a first filtering treatment of the torque command value, the first filtering treatment including a transmission characteristic having a band pass filter characteristic; a second paragraph calculator for calculating a second paragraph of the second torque target value by implementing a second filtering treatment of a motor revolution speed which is one of pieces of the vehicle information, the second filtering treatment including: a transmission characteristic having the band pass filter characteristic, and a model of a transmission characteristic between: a torque input to the vehicle, and the motor revolution speed; a torque target value calculator for calculating the second torque target value based on a deviation between: the first paragraph of the second torque target value, and the second paragraph of the second torque target value, wherein the model includes a numerator given by a second order expression and a denominator given by a third order expression, the torque target value calculator includes: a subtractor for subtracting the second paragraph of the second torque target value from the first paragraph of the second torque target value, and a filter for outputting the second torque target value by implementing a third filtering treatment of an output value of the subtractor, the third filtering treatment including a transmission characteristic including a numerator given by a second order expression and a denominator given by a second order expression, the transmission characteristic of the filter includes: the numerator which is given by the second order expression of the numerator of the model, and the denominator which is given by the second order expression having a second attenuation coefficient, the second attenuation coefficient being set larger than a first attenuation coefficient calculated from the numerator of the model and being set less than or equal to 1, and the torque command value calculator calculates the torque command value based on: the first torque target value, and the second torque target value subjected to the third filtering treatment by the filter.

According to a fifth aspect of the present invention, there is provided a method of controlling an electric vehicle having as a power source an electric motor driven based on a torque command value, the controlling method comprising: sensing vehicle information; setting a first torque target value based on the vehicle information; calculating the torque command value to the electric motor; calculating a first paragraph of a second torque target value by implementing a first filtering treatment of the torque command value, the first filtering treatment including a transmission characteristic having a band pass filter characteristic; calculating a second paragraph of the second torque target value by implementing a second filtering treatment of a motor revolution speed which is one of pieces of the vehicle information, the second filtering treatment including: a transmission characteristic having the band pass filter characteristic, and a model of a transmission characteristic between: a torque input to the vehicle, and the motor revolution speed; calculating the second torque target value based on a deviation between: the first paragraph of the second torque target value, and the second paragraph of the second torque target value, wherein the model includes a numerator given by a second order expression and a denominator given by a third order expression, the second torque target value calculating operation includes: subtracting the second paragraph of the second torque target value from the first paragraph of the second torque target value, and outputting the second torque target value by implementing a third filtering treatment of an output value of the subtracting operation, the third filtering treatment including a transmission characteristic including a numerator given by a second order expression and a denominator given by a second order expression, the transmission characteristic of the outputting operation includes: the numerator which is given by the second order expression of the numerator of the model, and the denominator which is given by the second order expression having a second attenuation coefficient, the second attenuation coefficient being set larger than a first attenuation coefficient calculated from the numerator of the model and being set less than or equal to 1, and the torque command value calculating calculates the torque command value based on: the first torque target value, and the second torque target value subjected to the third filtering treatment by the outputting operation.

According to a sixth aspect of the present invention, there is provided a controller of an electric vehicle having as a power source an electric motor driven based on a torque command value, the controller comprising: a sensing means for sensing vehicle information; a torque target value setting means for setting a first torque target value based on the vehicle information; a torque command value calculating means for calculating the torque command value to the electric motor; a first paragraph calculating means for calculating a first paragraph of a second torque target value by implementing a first filtering treatment of the torque command value, the first filtering treatment including a transmission characteristic having a band pass filter characteristic; a second paragraph calculating means for calculating a second paragraph of the second torque target value by implementing a second filtering treatment of a motor revolution speed which is one of pieces of the vehicle information, the second filtering treatment including: a transmission characteristic having the band pass filter characteristic, and a model of a transmission characteristic between: a torque input to the vehicle, and the motor revolution speed; a torque target value calculating means for calculating the second torque target value based on a deviation between: the first paragraph of the second torque target value, and the second paragraph of the second torque target value, wherein the model includes a numerator given by a second order expression and a denominator given by a third order expression, the torque target value calculating means includes: a subtracting means for subtracting the second paragraph of the second torque target value from the first paragraph of the second torque target value, and a filtering means for outputting the second torque target value by implementing a third filtering treatment of an output value of the subtractor, the third filtering treatment including a transmission characteristic including a numerator given by a second order expression and a denominator given by a second order expression, the transmission characteristic of the filtering means includes: the numerator which is given by the second order expression of the numerator of the model, and the denominator which is given by the second order expression having a second attenuation coefficient, the second attenuation coefficient being set larger than a first attenuation coefficient calculated from the numerator of the model and being set less than or equal to 1, and the torque command value calculating means calculates the torque command value based on: the first torque target value, and the second torque target value subjected to the third filtering treatment by the filtering means.

Other objects and features of the present invention will become understood from the following description with reference to the accompanying drawings.

BRIEF DESCRIPTION OF THE DRAWINGS

FIG. 24A to FIG. 22D show results of simulations where a vehicle model having a dead band is used as an actual plant Gp'(s).

DESCRIPTION OF THE PREFERRED EMBODIMENTS (First Embodiment)

Figure 1:
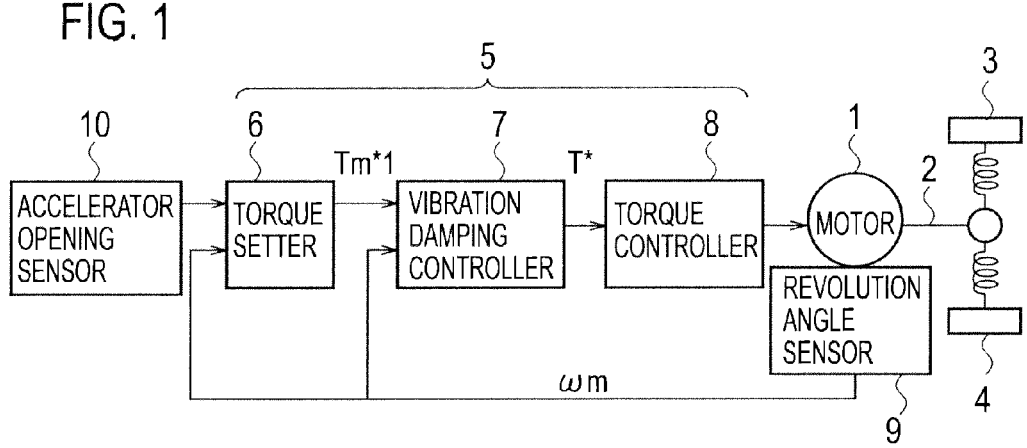
FIG. 1 is a block diagram schematically showing a structure of a controller of an electric vehicle, according to a first embodiment of the present invention.

FIG. 1 is a block diagram schematically showing a structure of a controller of an electric vehicle, according to a first embodiment of the present invention. A motor 1 operated by an electric power from a battery (not shown in FIG. 1) is installed in the electric vehicle according to the first embodiment. An output shaft of the motor 1 is connected to a decelerator (not shown in FIG. 1). The power from the motor 1 is transmitted to a left driving wheel 3 and a right driving wheel 4 by way of the decelerator and a drive shaft 2. Between the battery and the motor 1, an inverter (not shown in FIG. 1) is disposed. A direct current power of the battery is converted into a 3-phase alternating current power by means of the inverter and is supplied to the motor A controller 5 for controlling an output torque of the motor 1 is installed in the electric vehicle. The controller 5 includes a torque setter 6, a vibration damping controller 7, and a torque controller 8. As the controller 5, a microcomputer including such main components as CPU, ROM, RAM and I/O interface can be used. For implementing the torque control, pieces of vehicle information sensed with various sensors are inputted to the controller 5. By sensing a revolution angle of the motor 1, a revolution angle sensor 9 senses a motor revolution speed 107 m. An accelerator opening sensor 10 senses an acceleration amount (for example, acceleration opening degree) by a driver. According to the first embodiment, the revolution angle sensor 9 and the accelerator sensor 10 each function as a sensor for sensing the vehicle information.

Based on the vehicle information, that is, the sensed acceleration amount and motor revolution speed ωm, the torque setter 6 (torque target value setter) sets a first torque target value Tm*1. The thus set first torque target value Tm*1 is outputted to the vibration damping controller 7. With the first torque target value Tm*1 and motor revolution speed cam each as an input, the vibration damping controller 7 implements a calculation, to thereby determine a torque command value (motor torque command value) T*. The thus determined torque command value T* is outputted to the torque controller 8. By controlling the inverter using PWM control and the like, the torque controller 8 makes such a control that the output torque of the motor 1 follows the motor torque command value T*.

Figure 2:
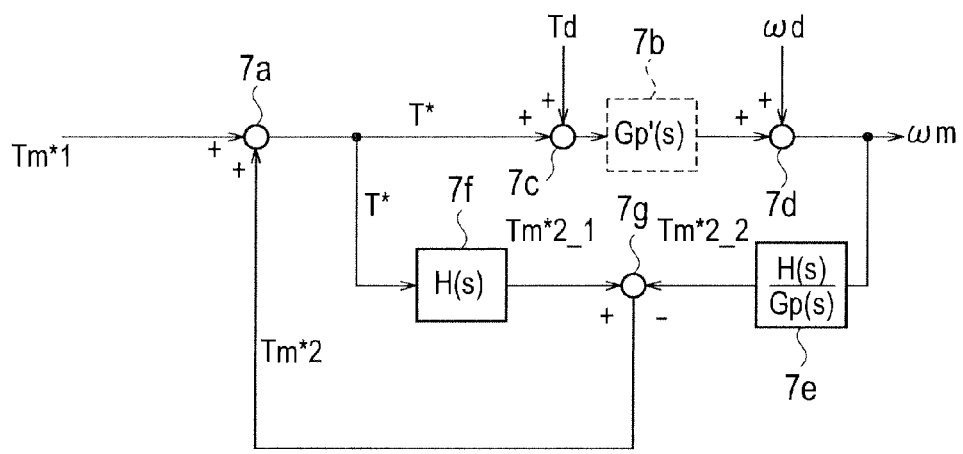
FIG. 2 is a block diagram showing a specific structure of a vibration damping controller.

FIG. 2 is a block diagram showing a specific structure of the vibration damping controller 7. In the vibration damping controller 7, the first torque target value Tm*1 and an after-described second torque target value Tm*2 are added by means of an adder 7a. The adder 7a serves as a torque command value calculator for calculating the torque command value T*. Based on the first torque target value Tm*1 and the after-described second torque target value Tm*2, the adder 7a calculates the addition (Tm*1 added by Tm*2) as the torque command value T*. The torque command value T* which is an output from the adder 7a is inputted to a control block 7b.

Herein, as shown in FIG. 1, in the controller 5, the torque command value T* as the output from the adder 7a as a part of the vibration damping controller 7 is inputted to the torque controller 8. Then, based on the torque command value T*, the torque controller 8 controls the motor 1 by way of the inverter (not shown in FIG. 1). This controlling drives the motor 1, to thereby allow the revolution angle sensor 9 to sense the revolution speed ωm of the motor 1. Then, the thus sensed revolution speed ωm is fed back to a control system.

In the block diagram shown in FIG. 2, the control block 7b has a transmission characteristic expressed by Gp'(s), alternatively representing an actual plant as the motor 1 on the electric vehicle, where the motor 1 is controlled by the torque controller 8 by way of the inverter (not shown in FIG. 1). With the torque command value T* as an input, the control block 7b outputs the motor revolution speed of the motor 1 as the actual plant Gp'(s). Herein, for reflecting a torque disturbance factor entering the actual plant Gp'(s), the torque command value T* outputted from the adder 7a is added by a torque disturbance factor Td by means of an adder 7c and then is inputted to the control block 7b. Moreover, for reflecting a motor revolution speed disturbance factor entering the actual plant Gp'(s), the motor revolution speed outputted from the control block 7b is added by a motor revolution speed disturbance factor ωd by means of an adder 7d. The output (motor revolution speed) from the adder 7d corresponds to the motor revolution speed ωm sensed by means of the revolution angle sensor 9. The motor revolution speed ωm outputted from the adder 7d is inputted to a control block 7e.

The control block 7e functions as a filter and a has a transmission characteristic expressed by H(s)/Gp(s). Herein, H(s) has a band pass filter characteristic. Meanwhile, Gp(s) is a model of a transmission characteristic (identification model of vehicle transmission characteristic, hereinafter otherwise referred to as "transmission characteristic model") between i) a torque input to the vehicle and ii) the motor revolution speed. With the motor revolution speed aim as an input, the control block 7e (second paragraph calculator) implements a filtering treatment (second filtering treatment) of the motor revolution speed ωm, to thereby output (calculate) a second paragraph Tm*2_2 of a second torque target value Tm*2. The second paragraph Tm*2_2 of the second torque target value Tm*2 is outputted to a subtractor 7g.

On the other hand, the torque command value T* which is an output from the adder 7a is also inputted to a control block 7f other than to the control block 7b. The control block 7f functions as a filter and has a transmission characteristic of a band pass filter, specifically, a transmission characteristic expressed by H(s). With the torque command value T* as an input, the control block 7f (first paragraph calculator) implements a filtering treatment (first filtering treatment) of the torque command value T*, to thereby output (calculate) a first paragraph Tm*2_1 of the second torque target value Tm*2.

The first paragraph Tm*2_1 of the second torque target value Tm*2 is then outputted to the subtractor 7g.

From the first paragraph Tm*2_1 of the second torque target value Tm*2, the subtractor 7g subtracts the second paragraph Tm*2_2 of the second torque target value Tm*2. The subtractor 7g functions as a torque target value calculator for calculating the second torque target value Tm*2. Based on a deviation between the first paragraph Tm*2_1 of the second torque target value Tm*2 and the second paragraph Tm*2_2 of the second torque target value Tm*2, the subtractor 7g calculates the second torque target value Tm*2. The second torque target value Tm*2 which is an output from the subtractor 7g is, as set forth above, outputted to the adder 7a.

One of the features of the first embodiment is that, a system structure of the vibration damping controller 7 suppresses the vibration from occurring to the output torque when the model Gp(s) of the transmission characteristic at the control block 7e is deviated from the actual plant Gp'(s) or when the motor revolution speed disturbance factor ωd is caused.

Figure 3:
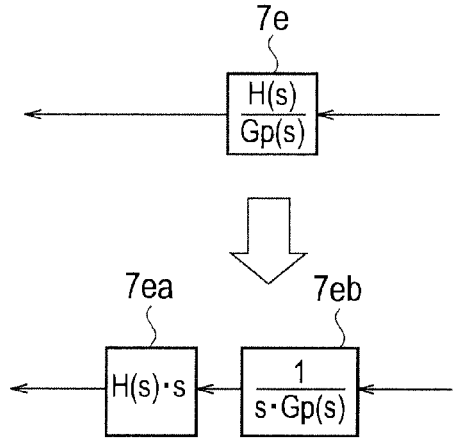
FIG. 3 explains a control block.

FIG. 3 explains the control block 7e. Hereinafter set forth is about the filter expressed by the transmission characteristic H(s)/Gp(s) of the control block 7e. By an equivalent conversion, the control block 7e having the transmission characteristic H(s)/Gp(s) can be divided into a control block 7ea having a transmission characteristic H(s)·s and a control block 7eb having a transmission characteristic 1/(s·Gp(s)).

Herein, the model Gp(s) of the transmission characteristic is to be set forth. The following expression 1 can be led as an equation of motion of a driving torsional vibration system.

$$Jm \cdot \omega m^* = Tm - TD/N$$

$$2Jw \cdot \omega w^* = TD - r \cdot F$$

$$M \cdot V^* = F$$

$$TD = KD \int (\omega m/N - \omega w) dt$$

$$F = KT(r \cdot \omega w - V) \qquad \text{[Expression 1]}$$

In the expression 1, the asterisk "*" added to upper right part of the reference sign denotes a time differential. Moreover, Jm denotes an inertia of the motor 1, Jw denotes an inertia of the driving wheels 3, 4, and M denotes a mass of the vehicle. Moreover, KD denotes a torsional rigidity of the driving system, KT denotes a friction coefficient between the tire and the road surface, N denotes an overall gear ratio, and r denotes a load radius of the tire. ωm denotes the motor revolution speed, Tm denotes a torque of the motor 1, and TD denotes a torque of the driving wheels 3, 4. Moreover, F denotes a force applied to the vehicle, V denotes a speed (velocity) of the vehicle and ωw denotes revolution speeds of the driving wheels 3, 4.

Then, based on the above equation of motion, the model Gp(s) of the transmission characteristic from the motor torque to the motor revolution speed is given by the following expression 2:

$$Gp(s) = \frac{(b_3 s^3 + b_2 s^2 + b_1 s + b_0)}{s(a_4 s^3 + a_3 s^2 + a_2 s + a_1)} \qquad \text{[Expression 2]}$$

Herein, each of the parameters in the expression 2 is given by the following expression 3:

$$a_4 = 2Jm \cdot Jw \cdot M$$

$$a_3 = Jm(2Jw + M \cdot r^2)KT$$

$$a_2 = (Jm + 2Jw/N^2) M \cdot KD$$

$$a_1 = (Jm + 2Jw/N^2 + M \cdot r^2/N^2) KD \cdot KT$$

$$b_3 = 2Jw \cdot M$$

$$b_2 = (2Jw + M \cdot r^2) KT$$

$$b_1 = M \cdot KD$$

$$b_0 = KD \cdot KT \qquad \text{[Expression 3]}$$

Checking the pole and zero point of the transmission function shown in the expression 2, it has been found out that one pole and one zero point show an extremely close value. This is equivalent to showing that α and β shown in the following expression 4 show an extremely close value.

$$Gp(s) = \frac{(s+\beta)(b'_2 s^2 + b'_1 s + b'_0)}{s(s+\alpha)(a'_3 s^2 + a'_2 s + a'_1)} \qquad \text{[Expression 4]}$$

Implementing a pole-zero offset (approximating α=β) in the expression 4 allows Gp(s) to include a transmission characteristic of (second order)/(third order), see the following expression 5-(1). Moreover, this expression 5-(1) can be changed to the following expression 5-(2).

[Expression 5]

$$Gp(s) = \frac{(b'_2 s^2 + b'_1 s + b'_0)}{s(a'_3 s^2 + a'_2 s + a'_1)} \qquad (1)$$

$$\frac{1}{s \cdot Gp(s)} = \frac{(a'_3 s^2 + a'_2 s + a'_1)}{(b'_2 s^2 + b'_1 s + b'_0)} \qquad (2)$$

The first embodiment focuses on the section of the denominator of the expression 5-(2). An attenuation coefficient ξz in a secondary vibration characteristic of 1/(s·Gp(s)) can be led from a relation (the following expression 6-(1)) with the section of the denominator of the expression 5-(2), to thereby obtain the following expression 6-(2).

[Expression 6]

$$\frac{b'_1}{b'_2} = 2\sqrt{\frac{b'_0}{b'_2}} \cdot \varsigma z \qquad (1)$$

$$\varsigma z = \frac{\frac{b'_1}{b'_2}}{2\sqrt{\frac{b'_0}{b'_2}}} \qquad (2)$$

The control block 7e according to the first embodiment substitutes the value (attenuation coefficient) ξz with a value ξ. Herein, the value ξz is lead by the expression 6-(2). Meanwhile, the value ξ is larger than the thus led value ξz, namely, the identification value ξz of the model Gp(s) of the transmission characteristic, in addition, the value ξ is less than or equal to 1 (ξz<ξ≦1). With this, the torque vibration of the output torque is suppressed, which vibration may be caused when the model Gp(s) of the transmission characteristic is deviated from the actual plant Gp'(s) or when the motor revolution speed disturbance ωd is caused.

Figure 4A:
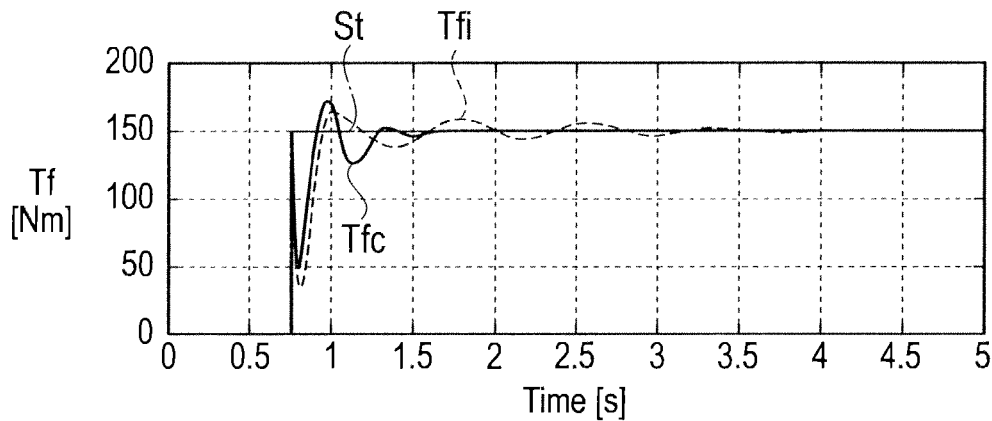
FIG. 4A to FIG. 4C show results of simulations where a vehicle model having a dead band is used as an actual plant Gp'(s).
Figure 4B:
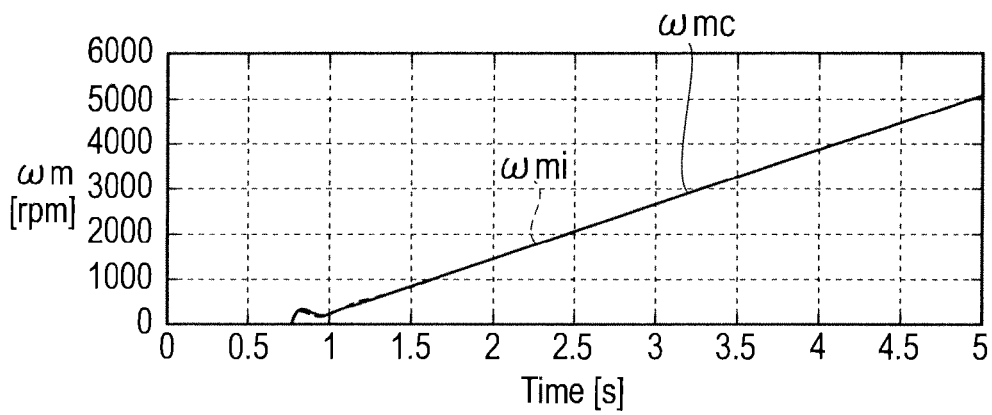
Figure 4C:
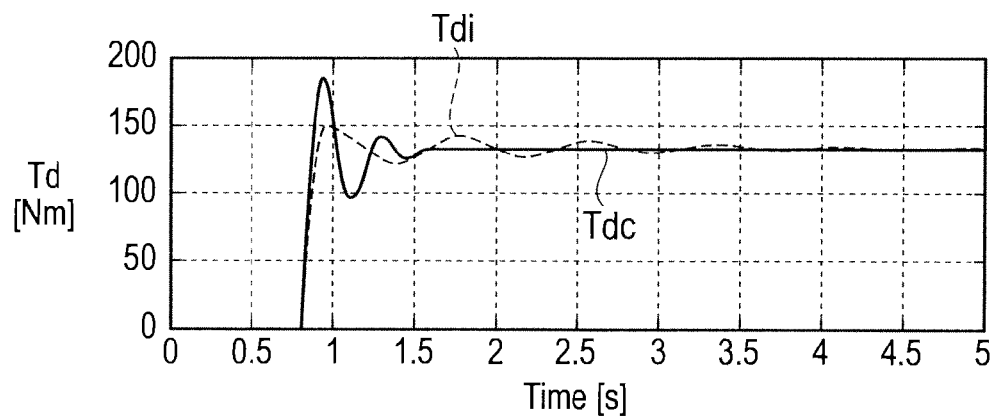

FIG. 4A to FIG. 4C show results of simulations where a vehicle model having a dead band of ±10 Nm at the drive shaft's transmission torque is used as the actual plant Gp'(s). FIG. 4A shows a transition of the output torque Tf, FIG. 4B shows a transition of the motor revolution speed ωm, and FIG. 4C shows a transition of the drive shaft's transmission torque Td. FIG. 4A to FIG. 4C show results of simulations at a start relative to a torque step command St from 0 Nm to 150 Nm. Herein, in each of the parameters Tf, ωm and Td, those added by "c" denote the result of the simulation where the control method according to the first embodiment for substituting the attenuation coefficient ξz is applied, while those added by "i" denote the result of simulation where the control method according to the first embodiment is not applied. Moreover, when the control method according to the first embodiment is applied, the above described attenuation coefficient ξz is substituted with ξ=1.

As is obvious from FIG. 4A to FIG. 4C, when the control method according to the first embodiment is not applied, the vibration continues at about 1.3 Hz in the case of the output torque Tfi and the drive shaft's transmission torque Tdi. On the other hand, when the control method according to the first embodiment is applied, the torque vibration converges at about one cycle in the case of the output torque Tfc and the drive shaft's transmission torque Tdc.

As such, according to the first embodiment, the control block 7e implements the filtering treatment (second filtering treatment) of the transmission characteristic expressed by H(s)/Gp(s). In the filtering treatment, the control block 7e uses the attenuation coefficient ξ (ξz<ξ≦1) which is set larger than the identification value ξz of the model Gp(s) of the transmission characteristic.

The above structure can suppress the torque vibration even when the vehicle transmission characteristic is deviated from the identification model Gp(s) thereof.

(Second Embodiment)

Hereinafter, the controller 5 of the electric vehicle according to a second embodiment of the present invention is to be set forth. The difference of the controller 5 according to the second embodiment from the controller 5 according to the first embodiment is the control method by the vibration damping controller 7. In addition, explanations about parts and portions common to those according to the first embodiment are to be omitted and therefore differences are mainly to be set forth hereafter.

Figure 5A:
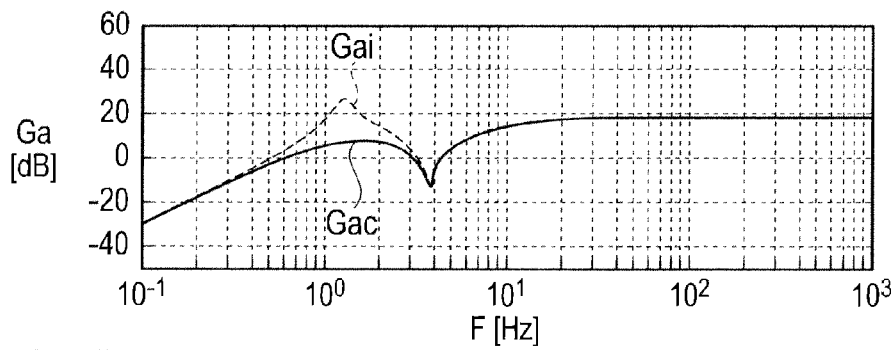
FIG. 5A to FIG. 5D are Bode diagrams of the transmission characteristic $H(s) \cdot s \times 1/(s \cdot Gp(s))$ as a result of frequency analysis, according to the first embodiment of the present invention.
Figure 5B:
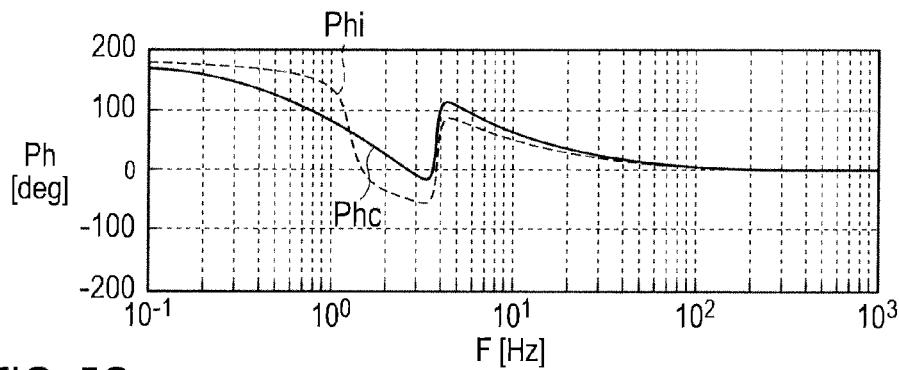
Figure 5C:
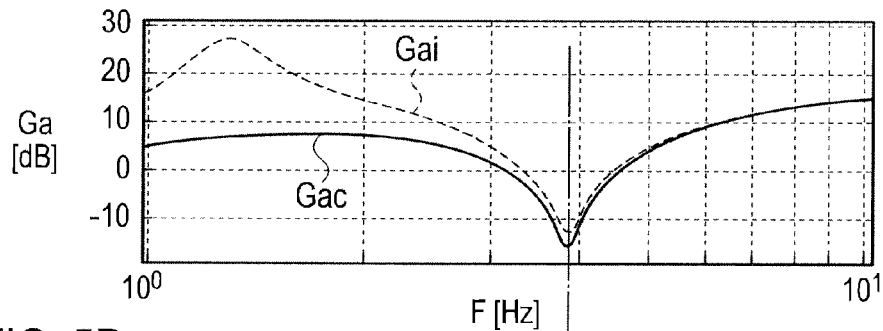
Figure 5D:
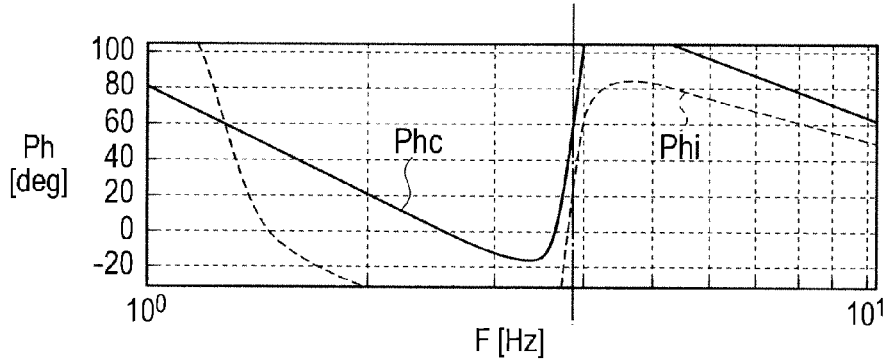

FIG. 5A to FIG. 5D are Bode diagrams of the transmission characteristic H(s)·s×1/(s·Gp(s)) as a result of frequency analysis, according to the first embodiment of the present invention. FIG. 5A shows a gain Ga relative to a frequency F, FIG. 5B shows a phase Ph relative to the frequency F. Moreover, FIG. 5C shows a partly enlarged view of FIG. 5A, and FIG. 5D shows a partly enlarged view of FIG. 5B. Herein, in each of the parameters Ga and Ph, those added by "c" denote the simulation results obtained when the control method according to the first embodiment is applied, while those added by "i" denote the simulation results obtained when the control method according to the first embodiment is not applied. Moreover, when the control method according to the first embodiment is applied, the above described attenuation coefficient ξz is substituted with ξ=1.

As is obvious from FIG. 5A to FIG. 5D, substituting of the attenuation coefficient ξz causes a gain difference of −1.9 dB and a phase difference of 33 deg at a to-be-controlled frequency (F=3.85 Hz), compared with the case not implementing the substituting. One of the features of the second embodiment is to correct this phase difference. Herein, the phase difference to be corrected is expressed by γ. According to the second embodiment, this phase difference γ is corrected by means of the transmission characteristic 11(s) having the band pass filter characteristic. According to the first embodiment, the transmission characteristic H(s), that is, the central frequency of the band pass filter coincides with the torsional resonant frequency of the driving system of the vehicle. According to the second embodiment, the center frequency of the transmission characteristic H(s) is shifted by an amount equivalent to a certain frequency, to thereby implement a phase compensation equivalent to the phase difference γ.

In the case that the band pass filter is combined with a first order high pass filter and a first order low pass filter, a transmission function thereof is given by the following expression 7.

$$\left(\frac{\omega c}{\omega c + s}\right) \times \left(\frac{s}{\omega c + s}\right) = \frac{\omega c \times s}{(\omega c + s)^2} \qquad [\text{Expression 7}]$$

Herein, ωc which is given by (fc(Hz)=ωc(rad/s)/2π) denotes a parameter corresponding to the center frequency fc after the phase compensation when the torsional resonant frequency is given by fp (fp(H)=ωp(rad/s)/2π.

Then, substituting "s" on the right side of the expression 7 with "j×ωp" makes the following expression 8.

$$\frac{\omega c \times j \times \omega p}{(\omega c^2 - \omega p^2) + (2 \times \omega c \times \omega p) \times j} \qquad [\text{Expression 8}]$$

On the right side (derived from the expression 7) shown in the expression 8, multiplying the denominator with each of the numerator and denominator changes the above right side to the following expression 9.

$$\frac{2 \times \omega c^2 \times \omega p^2}{(\omega c^2 + \omega p^2)^2} + \frac{(\omega c^2 - \omega p^2) \times \omega c \times \omega p}{(\omega c^2 + \omega p^2)^2} \times j \qquad [\text{Expression 9}]$$

Herein, the right side shown in the expression 9 is substituted with C+D·j, to thereby allow tanγ to meet the following expression 10.

$$\tan\gamma = \frac{D}{C} \qquad [\text{Expression 10}]$$
$$= \frac{(\omega c^2 - \omega p^2) \times \omega c \times \omega p}{2 \times \omega c^2 \times \omega p^2}$$
$$= \frac{\omega c^2 - \omega p^2}{2 \times \omega c \times \omega p}$$

The expression 10 can be changed to the following expression 11.

$$\omega c^2 + 2 \times \omega c \times \omega p \times \tan\gamma - \omega p^2 = 0 \qquad [\text{Expression 11}]$$

From the expression, 11, ωc meets the following expression 12.

$$\omega c = \frac{-2\tan\gamma \times \omega p + \sqrt{(-2\tan\gamma \times \omega p)^2 + 4\omega p^2}}{2} \qquad [\text{Expression 12}]$$

With this, based on ωc shown in the expression 12, the corrected center frequency fc can be calculated.

Figure 6A:
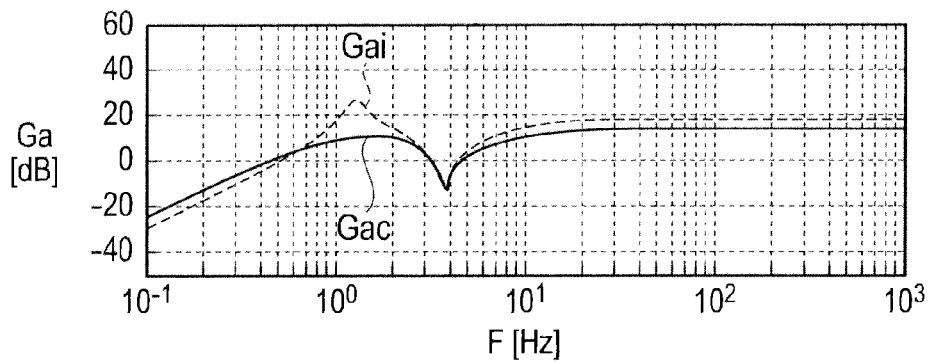
FIG. 6A to FIG. 6D are Bode diagrams of the transmission characteristic $H(s) \cdot s \times 1/(s \cdot Gp(s))$ as a result of frequency analysis, according to a second embodiment of the present invention.
Figure 6B:
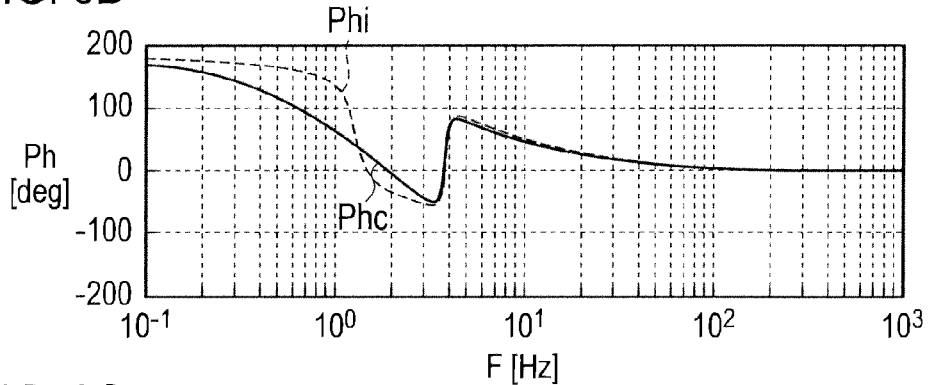
Figure 6C:
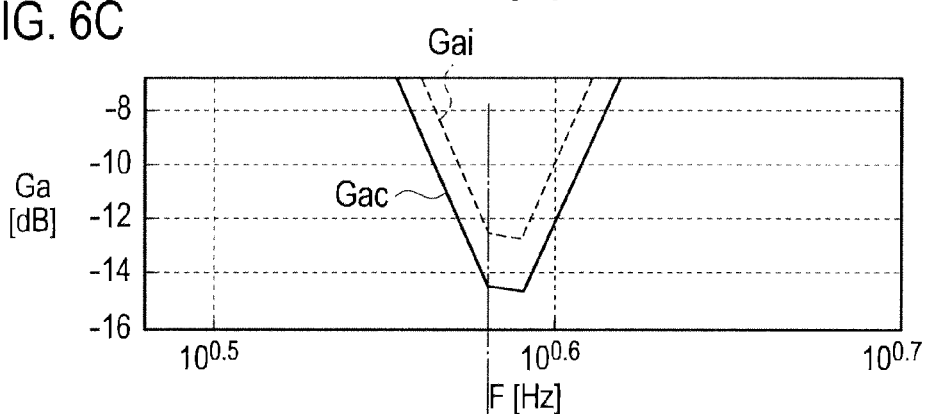
Figure 6D:
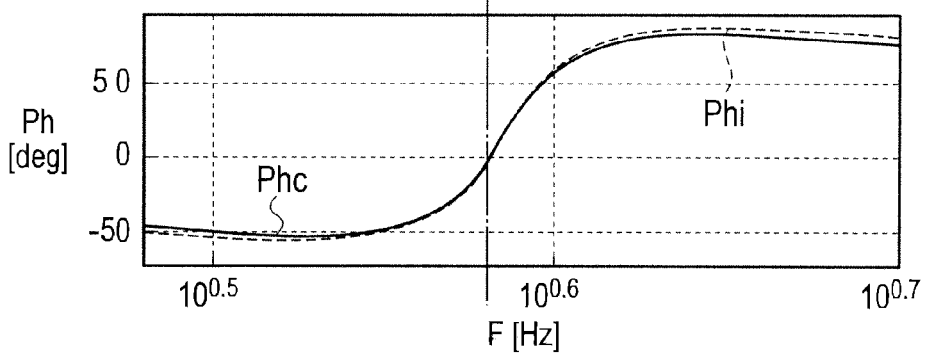

FIG. 6A to FIG. 6D are Bode diagrams of the transmission characteristic H(s)·s×1/(s·Gp(s)) as a result of frequency analysis, according to the second embodiment of the present invention. FIG. 6A shows a gain Ga relative to a frequency F, FIG. 6B shows a phase Ph relative to the frequency F. Moreover, FIG. 6C shows a partly enlarged view of FIG. 6A, and FIG. 6D shows a partly enlarged view of FIG. 6B. Herein, in each of the parameters Ga and Ph, those added by "c" denote the simulation results obtained when the control method according to the second embodiment for implementing the substitution of the attenuation coefficient ξz and the phase compensation by the central frequency fc is applied, while those added by "i" denote the simulation results obtained when the control method according to the second embodiment is not applied. Moreover, when the control method according to the second embodiment is applied, the above described attenuation coefficient ξz is substituted with ξ=1. As is obvious from FIG. 6D, the control method according to the second embodiment can correct the phase difference at the to-be-controlled frequency (F=3.85 Hz).

Figure 7A:
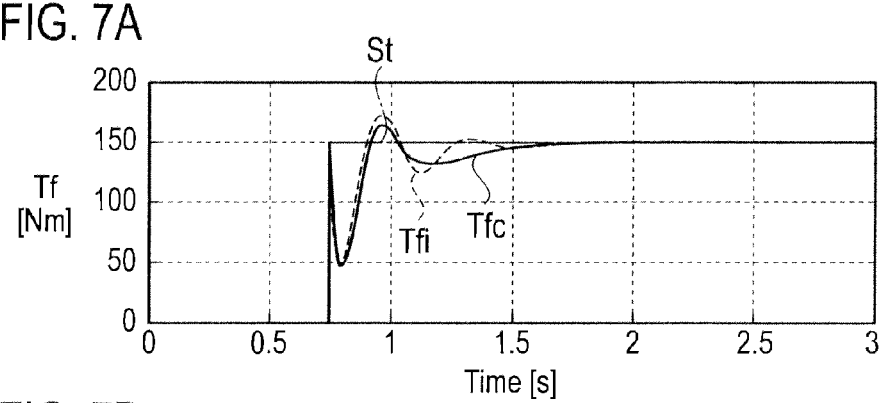
FIG. 7A to FIG. 7D show results of simulations where a vehicle model having a dead band is used as an actual plant Gp'(s).
Figure 7B:
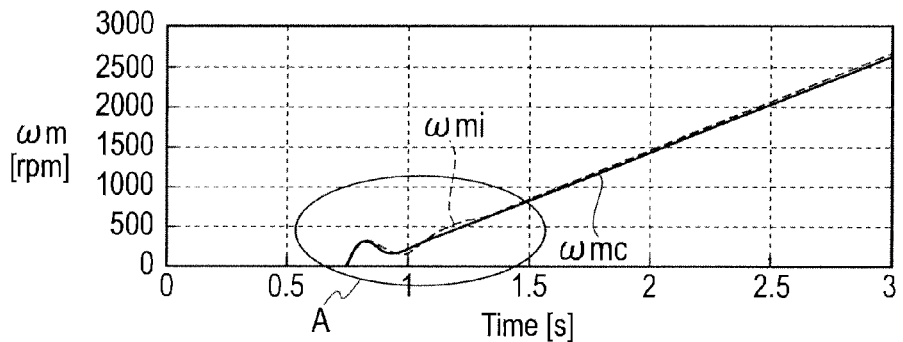
Figure 7C:
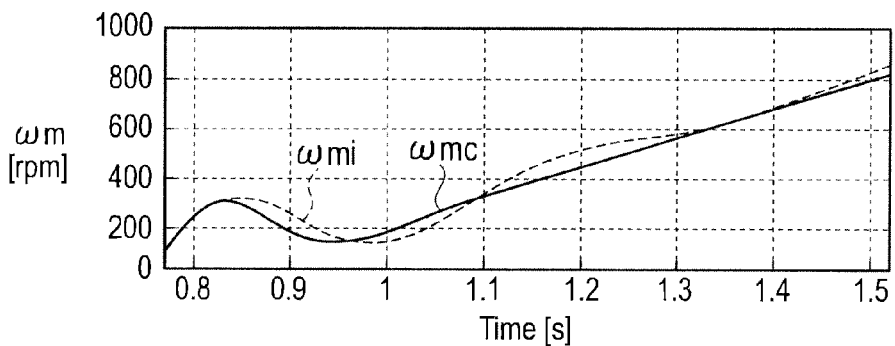
Figure 7D:
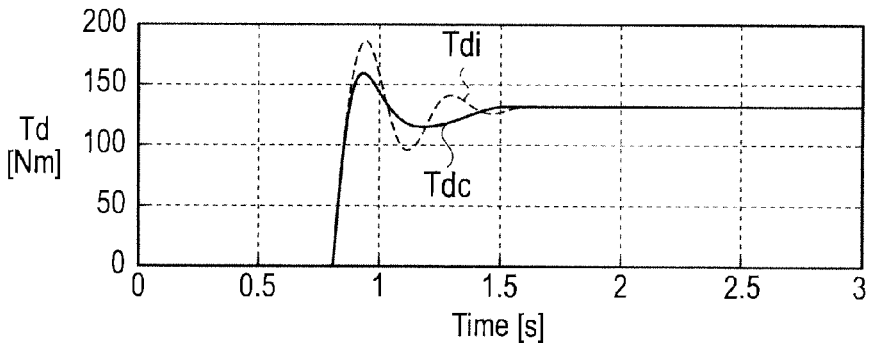

FIG. 7A to FIG. 7D show results of simulations where a vehicle model having a dead band of ±10 Nm at the drive shaft's transmission torque is used as the actual plant Gp'(s). FIG. 7A denotes a transition of the output torque Tf, FIG. 7B shows a transition of the motor revolution speed ωm. Moreover, FIG. 7C shows an enlarged view of an area A of FIG. 7B, and FIG. 7D shows a transition of the drive shaft's transmission torque Td. FIG. 7A to FIG. 7D show results of simulations at a start relative to a torque step command St from 0 Nm to 150 Nm. Herein, in each of the parameters Tf, ωm and Td, those added by "c" denote the result of the simulation where the control method according to the second embodiment is applied, while those added by "i" denote the result of simulation where the control method according to second embodiment is not applied.

As is obvious from FIG. 7A to FIG. 7D, when the control method according to the second embodiment is applied, compared with when the control method according to the second embodiment is not applied, overshoot of each of the output torque Tfi and the drive shaft's transmission torque Tdi is decreased, and thereby the effect of vibration damping of the motor revolution speed ωm is also improved.

As set forth above, according to the second embodiment, the control block 7e (second paragraph calculator) has a function to correct the shift of the frequency characteristic of the filter (transmission characteristic H(s)·s×1/(s·Gp(s)) at the to-be-controlled frequency. In this case, the control block 7e corrects the center frequency fc of the transmission characteristic H(s) having the band pass filter characteristic, to thereby correct the phase Ph at the to-be-controlled frequency. The above structure can decrease the overshoot of the output torque relative to the command torque, to thereby improve the effect of preventing vibration.

(Third Embodiment)

Hereinafter, the controller 5 of the electric vehicle according to a third embodiment of the present invention is to be set forth. The difference of the controller 5 according to the third embodiment from the controller 5 according to the first embodiment is the control method by the vibration damping controller 7. In addition, explanations about parts and portions common to those according to the first embodiment are to be omitted and therefore differences are mainly to be set forth hereafter.

According to the second embodiment, as a result of substituting the attenuation coefficient ξz, the phase difference γ caused at the to-be-controlled frequency of the transmission characteristic H(s)·s×1/(s·Gp(s)) is corrected by means of the transmission characteristic H(s) having the band pass filter characteristic. According to the third embodiment, the resonant frequency ωz of the secondary vibration characteristic caused when the transmission characteristic 1/(s·Gp(s)) is defined as the expression 5-(2) is led from the following expression 13.

$$\omega z = \sqrt{\frac{b'_0}{b'_2}}$$ [Expression 13]

Then, varying this resonant frequency ωz corrects the phase difference γ.

<First Example>

Figure 8A:
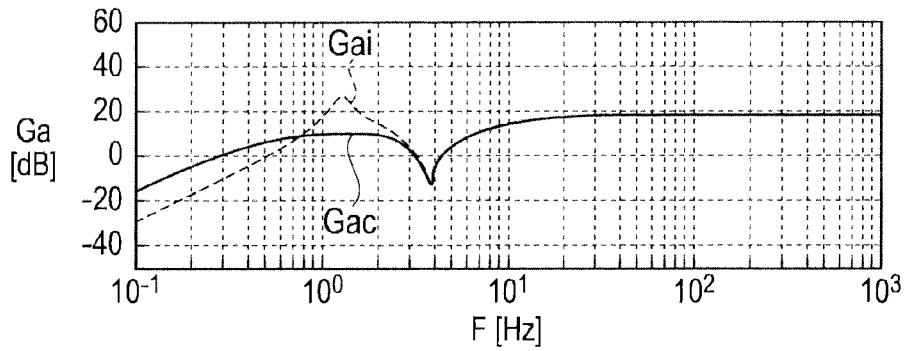
FIG. 8A to FIG. 8D are Bode diagrams of the transmission characteristic $H(s) \cdot s \times 1/(s \cdot Gp(s))$ as a result of frequency analysis, according to a first example of a third embodiment of the present invention.
Figure 8B:
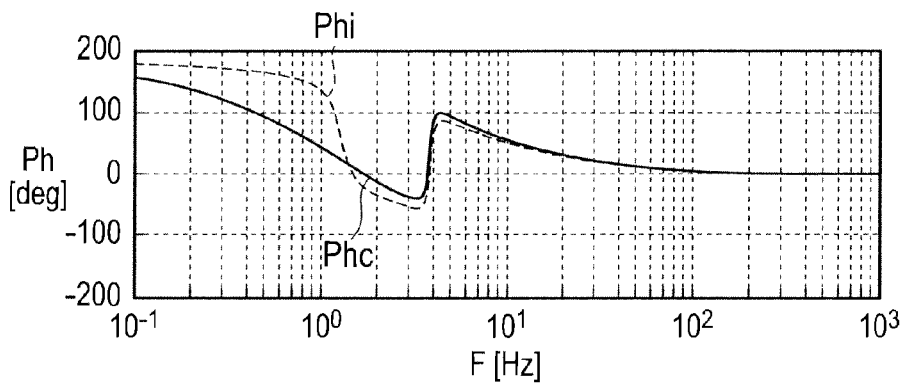
Figure 8C:
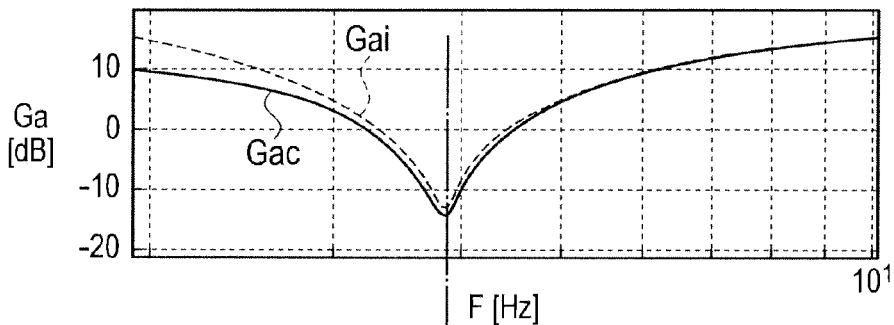
Figure 8D:
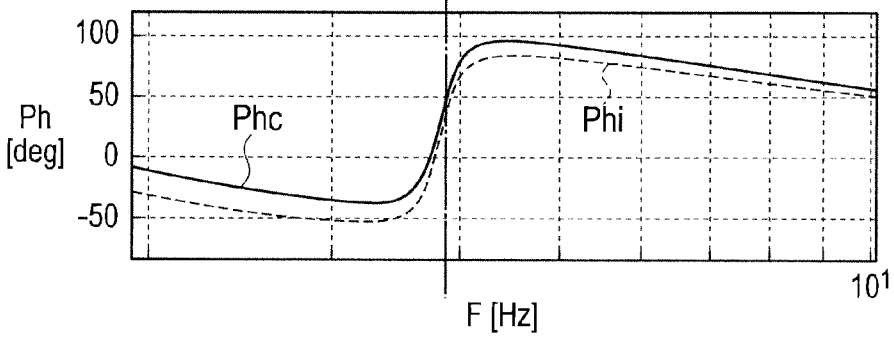

FIG. 8A to FIG. 8D are Bode diagrams of the transmission characteristic H(s)·s×1/(s·Gp(s)) as a result of frequency analysis, according to a first example of the third embodiment of the present invention. FIG. 8A shows a gain Ga relative to a frequency F, FIG. 8B shows a phase Ph relative to the frequency F. Moreover, FIG. 8C shows a partly enlarged view of FIG. 8A, and FIG. 8D shows a partly enlarged view of FIG. 8B. Herein, in each of the parameters Ga and Ph, those added by "c" denote the simulation results obtained when the control method according to the first example of the third embodiment (namely, i. substituting the attenuation coefficient ξz, and ii. compensating the phase by the resonant frequency ωz) is applied, while those added by "i" denote the simulation results obtained when the control method according to the first example of the third embodiment is not applied. Moreover, when the control method according to the first example of the third embodiment is applied, the above described attenuation coefficient ξz is substituted with ξ=1, and the resonant frequency ωz is made variable (equivalent to −0.7 Hz), to thereby implement the phase compensation. As is obvious from FIG. 8D, compared with the case in FIG. 5D according to the first embodiment, the control method according to the first example of the third embodiment can correct the phase difference at the to-be-controlled frequency (F=3.85 Hz).

<Second Example>

Figure 9A:
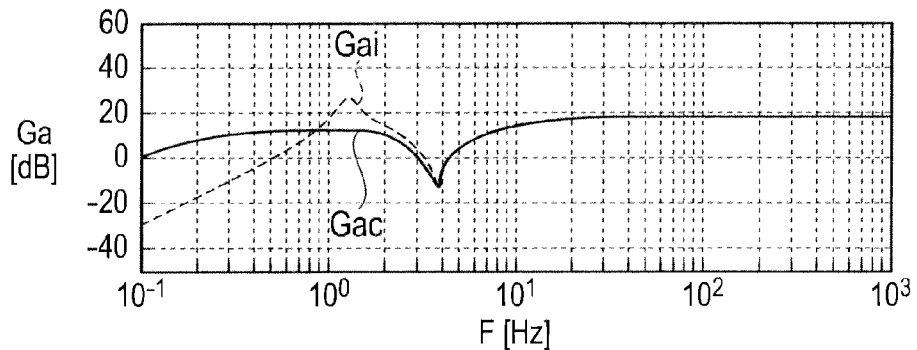
FIG. 9A to FIG. 9D are Bode diagrams of the transmission characteristic $H(s) \cdot s \times 1/(s \cdot Gp(s))$ as a result of frequency analysis, according to a second example of the third embodiment of the present invention.
Figure 9B:
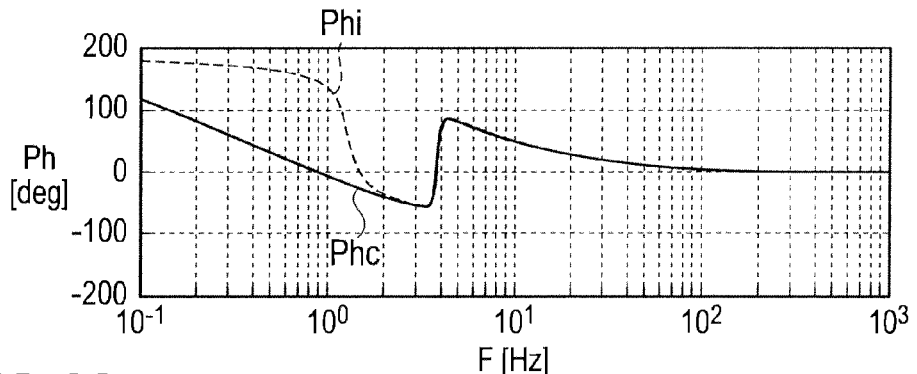
Figure 9C:
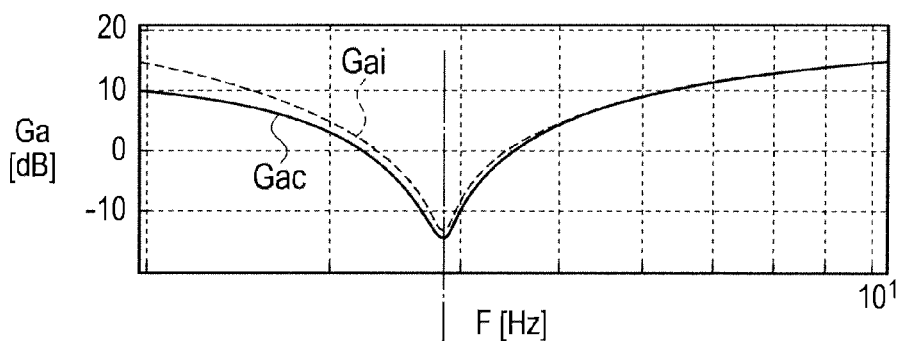
Figure 9D:
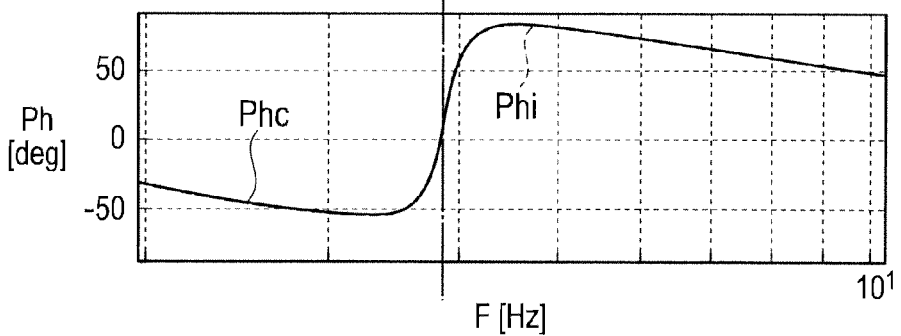

FIG. 9A to FIG. 9D are Bode diagrams of the transmission characteristic H(s)·s×1/(s·Gp(s)) as a result of frequency analysis, according to a second example of the third embodiment. FIG. 9A to FIG. 9D respectively correspond to FIG. 8A to FIG. 8D. In FIG. 9A to FIG. 9D, when the control method according to the second example of the third embodiment is applied, the above described attenuation coefficient ξz is substituted with ξ=1, and the resonant frequency ωz is made variable (equivalent to −1.1 Hz) to thereby implement the phase compensation. As is obvious from FIG. 9D, compared with the case in FIG. 5D according to the first embodiment, the control method according to the second example of the third embodiment can further correct the phase difference at the to-be-controlled frequency (F=3.85 Hz).

Figure 10A:
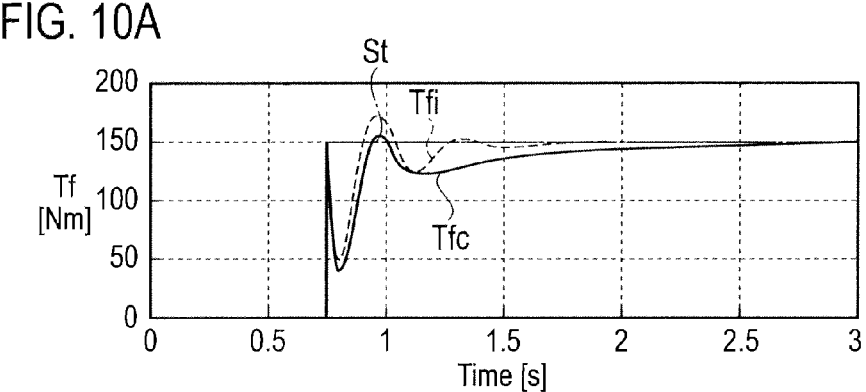
FIG. 10A to FIG. 10D show results of simulations where a vehicle model having a dead band is used as the actual plant Gp'(s).
Figure 10B:
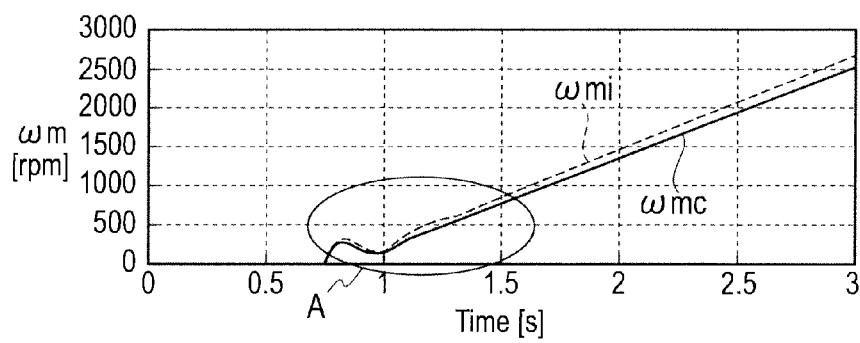
Figure 10C:
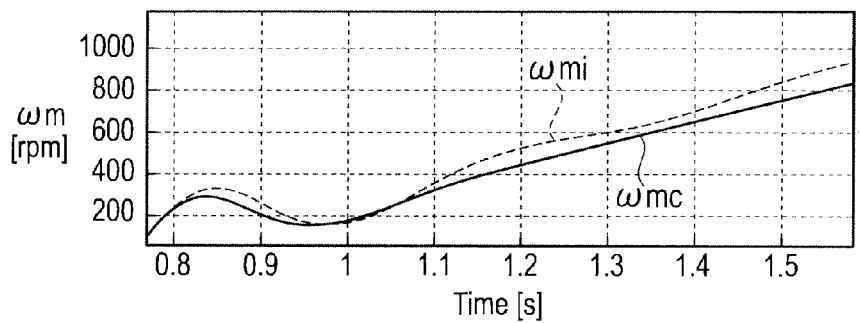
Figure 10D:
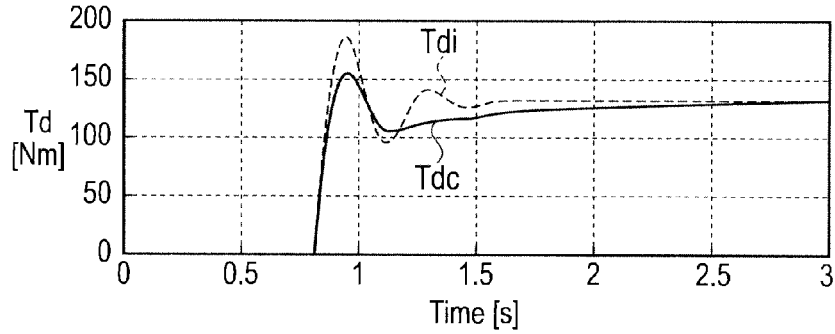
Figure 11A:
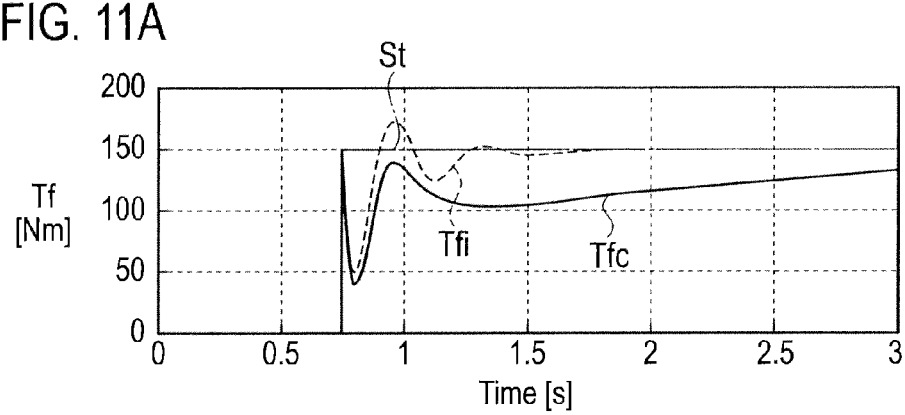
FIG. 11A to FIG. 11D show results of simulations where a vehicle model having a dead band is used as the actual plant Gp'(s).
Figure 11B:
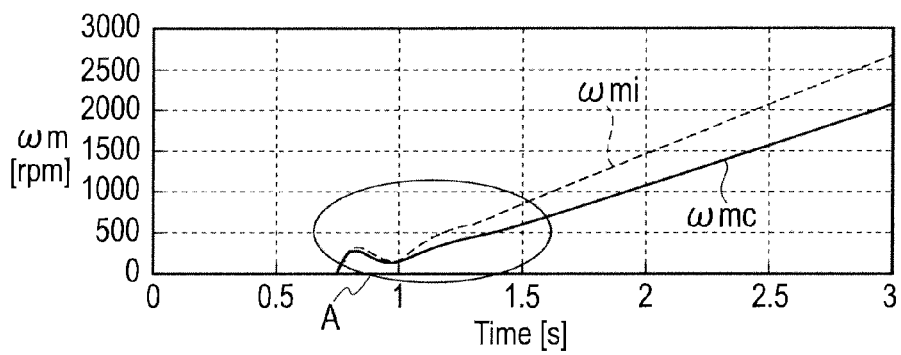
Figure 11C:
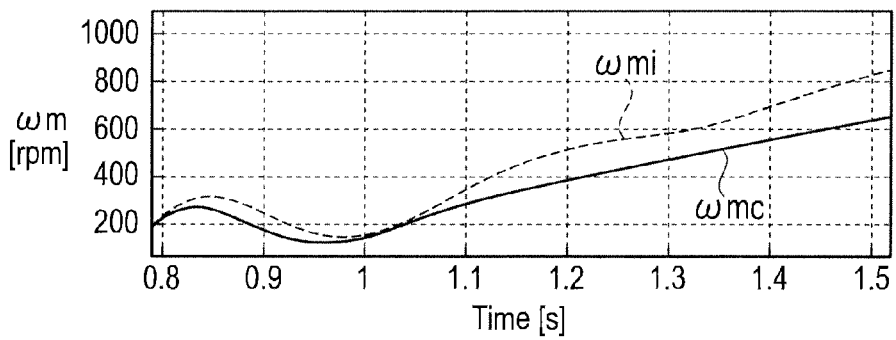
Figure 11D:
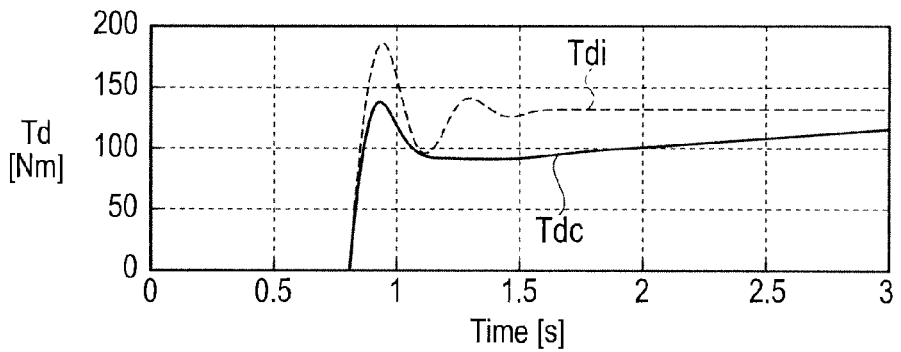

FIG. 10A to FIG. 10D and FIG. 11A to FIG. 11D show results of simulations where a vehicle model having a dead band of ±10 Nm at the drive shaft's transmission torque is used as the actual plant Gp'(s). FIG. 10A and FIG. 11A each denote a transition of the output torque Tf, FIG. 10B and FIG. 11B each show a transition of the motor revolution speed ωm. Moreover, FIG. 10C and FIG. 11C each show an enlarged view of an area A of FIG. 10B and FIG. 11B respectively, and FIG. 10D and FIG. 11D each show a transition of the drive shaft's transmission torque Td. FIG. 10A to FIG. 10D and FIG. 11A to FIG. 11D show results of simulations at a start relative to a torque step command St from 0 Nm to 150 Nm. Herein, in each of the parameters Tf, ωm and Td, those added by "c" denote the result of the simulation where the control method according to the third embodiment is applied, while those added by "i" denote the result of simulation where the control method according to third embodiment is not applied.

Herein, FIG. 10A to FIG. 10D show results of the simulations where the phase compensation is implemented with the resonant frequency ωz made variable (equivalent to −0.7 Hz) according to the first example of the third embodiment, while FIG. 11A to FIG. 11D show results of the simulations where the phase compensation is implemented with the resonant frequency ωz made variable (equivalent to −1.1 Hz) according to the second example of the third embodiment. As is obvious from each of FIG. 10A to FIG. 10D and FIG. 11A to FIG. 11D, when the control method according to the third embodiment is applied, compared with when the control method according to the third embodiment is not applied, the effect of vibration damping of the motor revolution speed cam is improved. Moreover, in the case of the phase compensation ωz with the resonant frequency ωz equivalent to −1.1 Hz (refer to FIG. 11A to FIG. 11D) according to the second example of the third embodiment, the overshoot is not caused to the characteristic of each of the output torque Tfc and the drive shaft's transmission torque Tdc, which is an advantage. Meanwhile, according to the second example of the third embodiment, the undershoot is caused frequently and the time for recovery is likely to be long. On the other hand, in the case of the phase compensation ωz with the resonant frequency ωz equivalent to −0.7 Hz (refer to FIG. 10A to FIG. 10D) according to the first example of the third embodiment, although the overshoot remains to a certain extent, the undershoot amount is small, featuring a good tendency. According to the phase compensation amount, the characteristic of the output torque Tf is different from the characteristic of the drive shaft's transmission torque Td. Therefore, the resonant frequency ωz is to be determined as needed, to thereby implement the phase compensation.

As set forth above, according to the third embodiment, the control block 7e has a correction function to correct the shift of the frequency characteristic of the filtering treatment (transmission characteristic (H(s)·s×1/(s·Gp(s))) at the to-be-controlled frequency. In this case, the above filtering treatment, specifically, varying the frequency ωz of the resonant frequency characteristic of the transmission characteristic 1/(s·Gp(s)) corrects the phase Ph at the to-be-controlled frequency. The above structure can decrease the overshoot of the output torque relative to the command toque, to thereby improve the effect of preventing vibration.

(Fourth Embodiment)

Hereinafter, the controller 5 of the electric vehicle according to a fourth embodiment of the present invention is to be set forth. The difference of the controller 5 according to the fourth embodiment from the controller 5 according to the second or third embodiment is the control method by the vibration damping controller 7. In addition, explanations about parts and portions common to those according to the first embodiment are to be omitted and therefore differences are mainly to be set forth hereafter.

Figure 12:
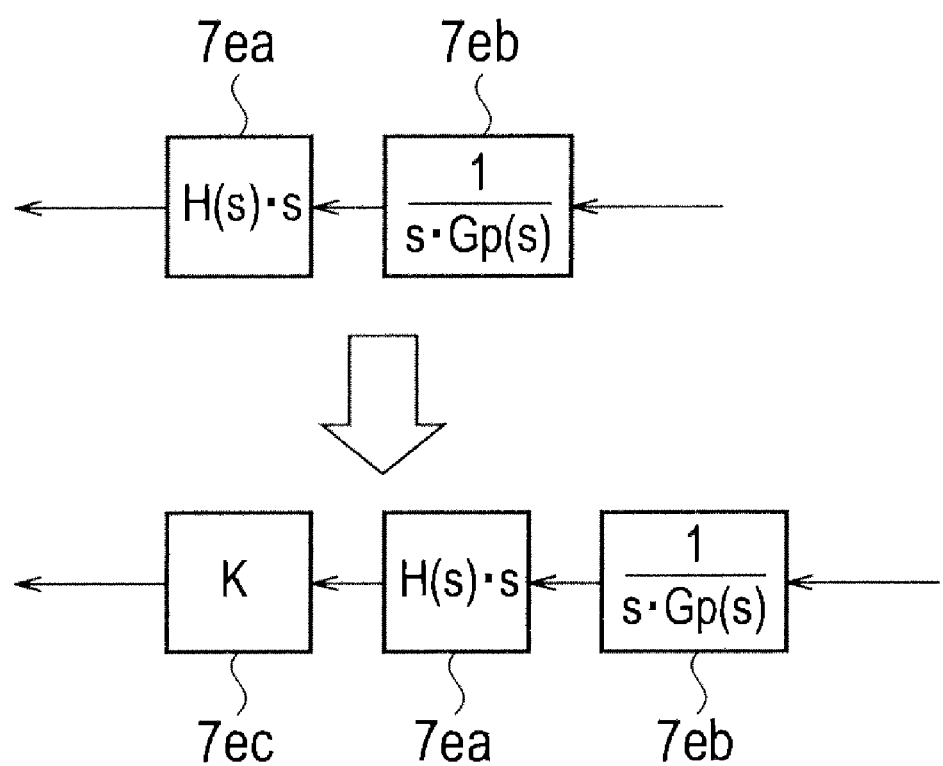
FIG. 12 explains the control block, according to a fourth embodiment of the present invention.

FIG. 12 explains the control block 7e according to the fourth embodiment of the present invention. According to the fourth embodiment, the control block 7e includes the control block 7ea having the transmission characteristic H(s)·s, the control block 7eb having the transmission characteristic 1/(s·Gp(s)), and a control block 7ec having a transmission characteristic K which functions as a gain. Then, adjusting this gain K compensates the gain difference at the to-be-controlled frequency as shown in FIG. 5A to FIG. 5D.

Figure 13A:
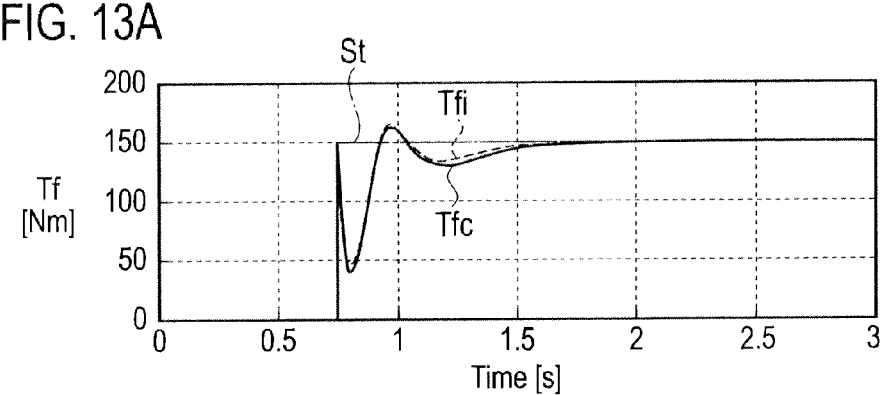
FIG. 13A to FIG. 13D show results of simulations where a vehicle model having a dead band is used as the actual plant Gp'(s).
Figure 13B:
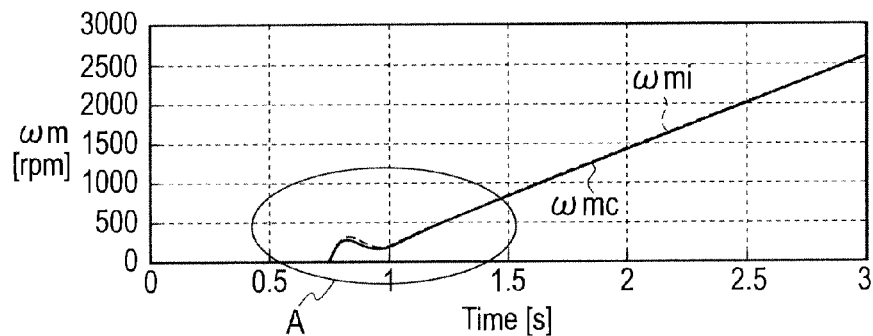
Figure 13C:
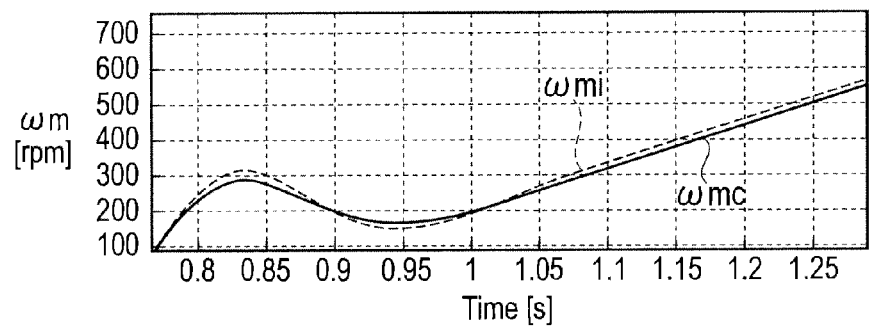
Figure 13D:
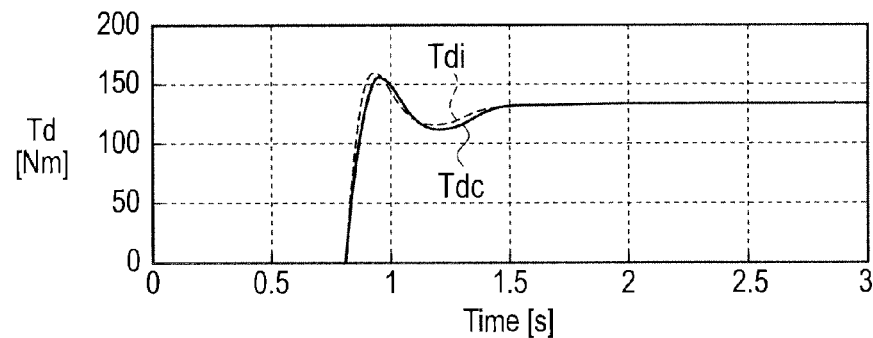

FIG. 13A to FIG. 13D show results of simulations where a vehicle model having a dead band of ±10 Nm at the drive shaft's transmission torque is used as the actual plant Gp'(s). FIG. 13A shows a transition of the output torque Tf, FIG. 13B shows a transition of the motor revolution speed ωm, and FIG. 13C shows an enlarged view of an area A of FIG. 13B, and FIG. 13D shows a transition of the drive shaft's transmission torque Td. FIG. 13A to FIG. 13D show results of simulations at a start relative to a torque step command St from 0 Nm to 150 Nm. Herein, in each of the parameters Tf, ωm and Td, those added by "c" denote the result of the simulation where the control method according to the fourth embodiment is applied, specifically, the attenuation coefficient ξz is substituted, the phase compensation is implemented and the gain compensation by means of the gain K is implemented. Meanwhile, those added by "i" denote the result of simulation where only the attenuation coefficient ξz's substitution and the phase compensation are implemented.

Figure 14A:
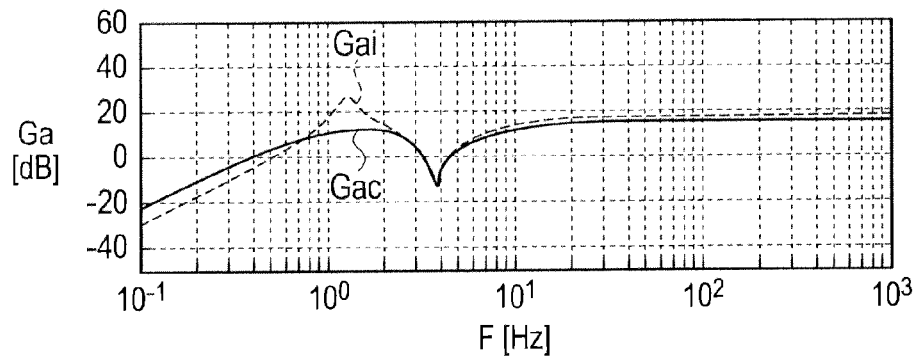
FIG. 14A to FIG. 14D are Bode diagrams of the transmission characteristic $H(s) \cdot s \times 1/(s \cdot Gp(s))$ as a result of frequency analysis, according to the fourth embodiment of the present invention.
Figure 14B:
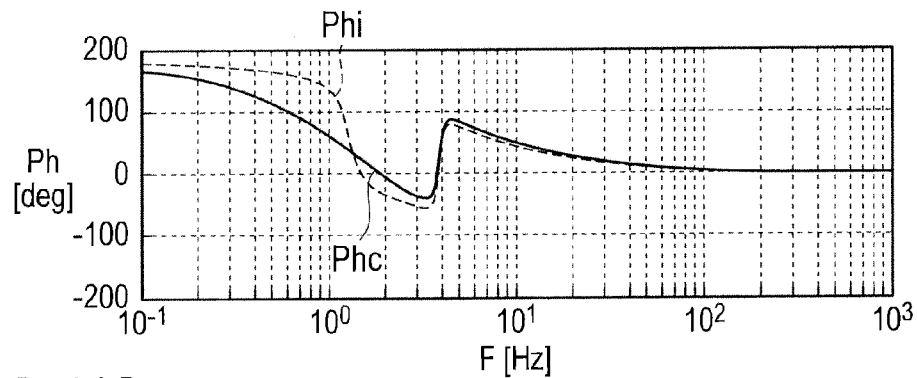
Figure 14C:
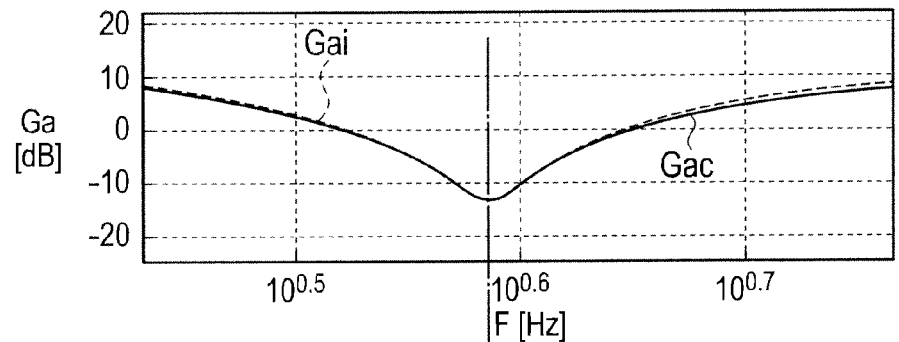
Figure 14D:
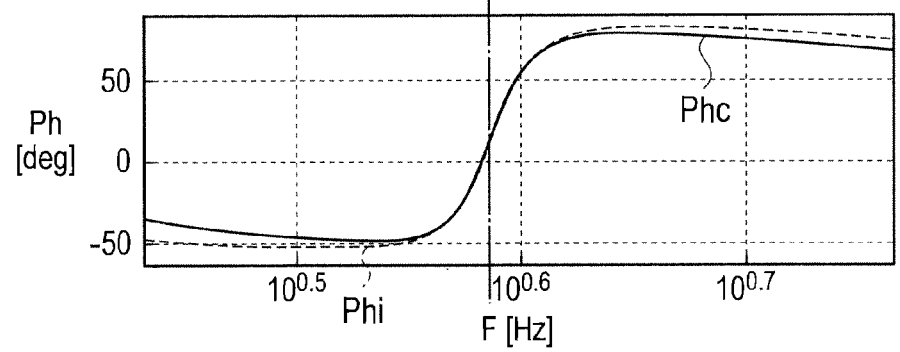

FIG. 14 to FIG. 14D are Bode diagrams of the transmission characteristic H(s)·s×1/(s·Gp(s)) as a result of frequency analysis. FIG. 14A shows a gain Ga relative to a frequency F, FIG. 14B shows a phase Ph relative to the frequency F. Moreover, FIG. 12C shows a partly enlarged view of FIG. 12A, and FIG. 12D shows a partly enlarged view of FIG. 12B. Herein, in each of the parameters Ga and Ph, those added by "c" denote the simulation results obtained when the control method according to the fourth embodiment is applied, while those added by "i" denote the simulation results obtained when the control method according to the fourth embodiment is not applied.

As is obvious from FIG. 13A to FIG. 13D and FIG. 14A to FIG. 14D, the control method with the gain compensation in addition to the phase compensation, compared with the control method with only the phase compensation, somewhat decreases the overshoot of each of the output torque Tfc and the drive shaft's transmission torque Td, to thereby improve the effect of vibration damping of the motor revolution speed.

As set forth above according to the fourth embodiment, the control block 7e has the correction function to correct the shift of the frequency characteristic of the filtering treatment (transmission characteristic H(s)·s×1/s·Gp(s))) at the to-be-controlled frequency. In this case, the control block 7e corrects the gain of the transmission characteristic H(s) having the band pass filter characteristic, to thereby correct the gain Ga at the to-be-controlled frequency. The above structure decreases the overshoot of the output torque relative to the command torque, to thereby improve the effect of preventing vibration.

(Fifth Embodiment)

Figure 15:
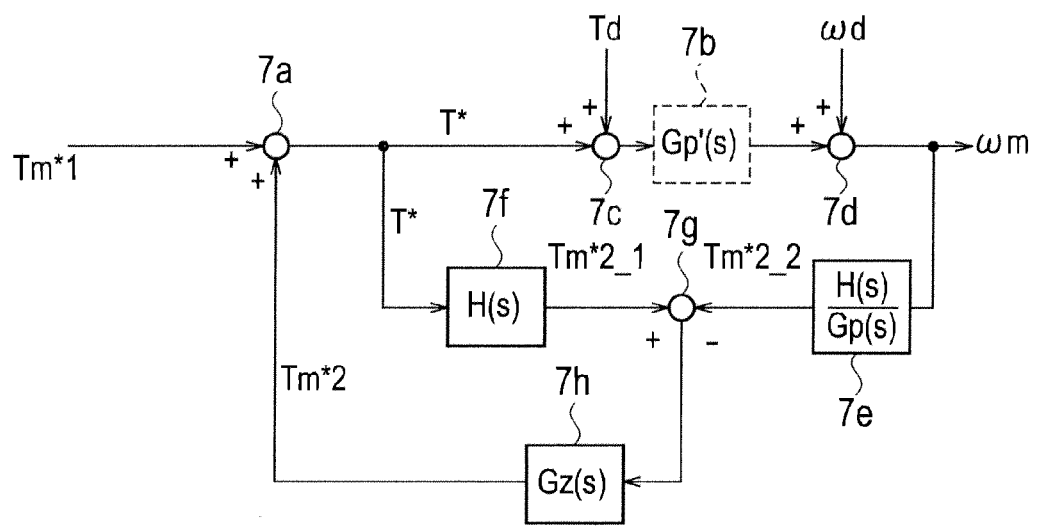
FIG. 15 is a block diagram showing a specific structure of a vibration damping controller, according to a fifth embodiment of the present invention.

Hereinafter, the controller 5 of the electric vehicle according to a fifth embodiment of the present invention is to be set forth. FIG. 15 is a block diagram showing a specific structure of the vibration damping controller 7, according to the fifth embodiment of the present invention. In the vibration damping controller 7, the first torque target value Tm*1 and an after-described second torque target value Tm*2 are inputted to the adder 7a and then added by means of the adder 7a. The adder 7a serves as a torque command value calculator for calculating the torque command value T*. Based on the first torque target value Tm*1 and the second torque target value Tm*2, the adder 7a calculates the addition (Tm*1 added by Tm*2) as the torque command value T*. The torque command value T* which is an output from the adder 7a is inputted to the control block 7b.

Herein, as shown in FIG. 1, in the controller 5, the torque command value T* as the output from the adder 7a as a part of the vibration damping controller 7 is inputted to the torque controller 8. Then, based on the torque command value T*, the torque controller 8 controls the motor 1 by way of the inverter (not shown in FIG. 1). This controlling drives the motor 1, to thereby allow the revolution angle sensor 9 to sense the revolution speed ωm of the motor 1. Then, the thus sensed revolution speed ωm is fed back to the control system.

In the block diagram shown in FIG. 15, the control block 7b has a transmission characteristic expressed by Gp'(s), alternatively representing an actual plant as the motor 1 on the electric vehicle, where the motor 1 is controlled by the torque controller 8 by way of the inverter (not shown in FIG. 1). With the torque command value T* as an input, the control block 7b outputs the motor revolution speed of the motor 1 as the actual plant Gp'(s). Herein, for reflecting a torque disturbance factor entering the actual plant Gp'(s), the torque command value T* outputted from the adder 7a is added by a torque disturbance factor Td by means of an adder 7c and then is inputted to the control block 7b. Moreover, for reflecting a motor revolution speed disturbance factor entering the actual plant Gp'(s), the motor revolution speed outputted from the control block 7b is added by a motor revolution speed disturbance factor ωd by means of the adder 7d. The output (motor revolution speed) from the adder 7d corresponds to the motor revolution speed ωm sensed by means of the revolution angle sensor 9. The motor revolution speed ωm outputted from the adder 7d is inputted to the control block 7e.

The control block 7e functions as a filter and a has a transmission characteristic expressed by H(s)/Gp(s). Herein, H(s) has a band pass filter characteristic. Meanwhile, Gp(s) is a model of a transmission characteristic (identification model of vehicle transmission characteristic, hereinafter otherwise referred to as "transmission characteristic model") between i) a torque input to the vehicle and ii) the motor revolution speed. With the motor revolution speed ωm as an input, the control block 7e (second paragraph calculator) implements the filtering treatment (second filtering treatment) of the motor revolution speed ωm, to thereby output (calculate) the second paragraph Tm*2_2 of a second torque target value Tm*2. The second paragraph Tm*2_2 of the second torque target value Tm*2 is outputted to the subtractor 7g.

On the other hand, the torque command value T* which is the output from the adder 7a is also inputted to the control block 7f other than to the control block 7b. The control block 7f functions as a filter and has a transmission characteristic of a band pass filter, specifically, a transmission characteristic expressed by H(s). With the torque command value T* as an input, the control block 7f (first paragraph calculator) implements a filtering treatment (first filtering treatment), to thereby output (calculate) the first paragraph Tm*2_1 of the second torque target value Tm*2. The first paragraph Tm*2_1 of the second torque target value Tm*2 is outputted to the subtractor 7g.

From the first paragraph Tm*2_1 of the second torque target value Tm*2, the subtractor 7g subtracts the second paragraph Tm*2_2 of the second torque target value Tm*2, to thereby calculate the deviation between the first paragraph Tm*2_1 of the second torque target value Tm*2 and the second paragraph Tm*2_2 of the second torque target value Tm*2. The deviation (Tm*2_1–Tm*2_2) between the first paragraph Tm*2_1 of the second torque target value Tm*2 and the second paragraph Tm*2_2 of the second torque target value Tm*2 is an output from the subtractor 7g and is then outputted to a control block 7h.

The control block 7h has a function as a filter and this filter has a transmission characteristic expressed by Gz(s). Herein, details of the transmission characteristic Gz(s) are to be set forth afterward. With the output value from the subtractor 7g as an input, the control block 7h (filter) implements a filtering treatment (third filtering treatment) of the input value, to thereby output the second torque target value Tm*2. The thus calculated second torque target value Tm*2 is outputted to the adder 7a, as described above. That is, based on the deviation (Tm*2_1−Tm*2_2) between the first paragraph Tm*2_1 of the second torque target value Tm*2 and the second paragraph Tm*2_2 of the second torque target value Tm*2, the above subtractor 7g and the above control block 7h calculate the second torque target value Tm*2, thus featuring as a torque target value calculator.

One of the features of the fifth embodiment is that, the system structure of the vibration damping controller 7 suppresses the vibration from occurring to the output torque when the model Gp(s) of the transmission characteristic at the control block 7e is deviated from the actual plant Gp'(s) or when the motor revolution speed disturbance factor cod is caused.

Hereinafter, a method of setting the filter expressed by the transmission characteristic Gz(s) which is one of the features of the fifth embodiment is to be set forth. The transmission characteristic Gz(s) is set based on the transmission characteristic model Gp(s). Therefore, the transmission characteristic model Gp(s) is to be set forth at first. The following expression 14 can be led as an equation of motion of a driving torsional vibration system.

$$Jm \cdot \omega m^* = Tm - TD/N$$

$$2Jw \cdot \omega w^* = TD - r \cdot F$$

$$M \cdot V^* = F$$

$$TD = KD \int (\omega m/N - \omega w) dt$$

$$F = KT(r \quad \omega w - V)$$ [Expression 14]

In the expression 14, the asterisk "*" added to upper right part of the reference sign denotes a time differential. Moreover, Jm denotes an inertia of the motor 1, Jw denotes an inertia of the driving wheels 3, 4, and M denotes a mass of the vehicle. Moreover, KD denotes a torsional rigidity of the driving system, KT denotes a friction coefficient between the tire and the road surface, N denotes an overall gear ratio, and r denotes a load radius of the tire. ωm denotes the motor revolution speed, Tm denotes a torque of the motor 1, and TD denotes a torque of the driving wheels, 3, 4. Moreover, F denotes a force applied to the vehicle, V denotes a speed (velocity) of the vehicle and ωw denotes revolution speeds of the driving wheels 3, 4.

Then, based on the above equation of motion, the model Gp(s) of the transmission characteristic from the motor torque to the motor revolution speed is given by the following expression 15:

$$Gp(s) = \frac{(b_3 s^3 + b_2 s^2 + b_1 s + b_0)}{s(a_4 s^3 + a_3 s^2 + a_2 s + a_1)}$$ [Expression 15]

Herein, each of the parameters in the expression 15 is given by the following expression 16:

$$a_4 = 2Jm \cdot Jw \cdot M$$

$$a_3 = Jm(2Jw + M \cdot r^2)KT$$

$$a_2 = (Jm + 2Jw/N^2)M \cdot KD$$

$$a_1 = (Jm + 2Jw/N^2 + M \cdot r^2/N^2)KD \cdot KT$$

$$b_3 = 2Jw \cdot M$$

$$b_2 = (2Jw + M \cdot r^2)KT$$

$$b_1 = M \cdot KD$$

$$b_0 = KD \cdot KT$$ [Expression 16]

Checking the pole and zero point of the transmission function shown in the expression 15, it has been found out that one pole and one zero point show an extremely close value. This is equivalent to showing that α and β shown in the following expression 17 show an extremely close value.

$$Gp(s) = \frac{(s + \beta)(b'_2 s^2 + b'_1 s + b'_0)}{s(s + \alpha)(a'_3 s^2 + a'_2 s + a'_1)}$$ [Expression 17]

Implementing a pole-zero offset (approximating α=β) in the expression 17 allows Gp(s) to include a transmission characteristic of (second order)/(third order), see the following expression 18.

$$Gp(s) = \frac{(b'_2 s^2 + b'_1 s + b'_0)}{s(a'_3 s^2 + a'_2 s + a'_1)}$$ [Expression 18]

The fifth embodiment focuses on the section of the numerator of the expression 18. When the coefficients of the numerator are defined sequentially as A (second order coefficient, that is, $b_2'$), B (first order coefficient, that is, $b_1'$) and C (zero order coefficient, that is, $b_0'$), such coefficients A, B and C meet the following expression 19 relative to an attenuation coefficient ξz.

$$\frac{B}{A} = 2\sqrt{\frac{C}{A}} \cdot \varsigma z$$ [Expression 19]

From the expression 19, the attenuation coefficient ξz can be given by the following expression 20.

$$\varsigma z = \frac{\frac{b'_1}{b'_2}}{2\sqrt{\frac{b'_0}{b'_2}}}$$ [Expression 20]

The attenuation coefficient ξz is calculated from the expression 20, to thereby determine a coefficient ξc which is larger than the calculated ξz and less than or equal to 1 (ξz<ξc≦1). Based on this coefficient ξc, the transmission characteristic Gz(s) is calculated from the following expression 21.

$$Gz(s) = \frac{b'_2 s^2 + b'_1 s + b'_0}{s^2 + 2\sqrt{\frac{b'_0}{b'_2}} \times \varsigma c \cdot s + \frac{b'_0}{b'_2}}$$ [Expression 21]

According to the fifth embodiment, providing the control block 7h having the filter expressed by the transmission characteristic Gz(s) can suppress the vibration from occurring to the output torque, which vibration may be caused when the model Gp(s) of the transmission characteristic is deviated from the actual plant Gp'(s) or when the motor revolution speed disturbance ωd is caused.

Figure 16A:
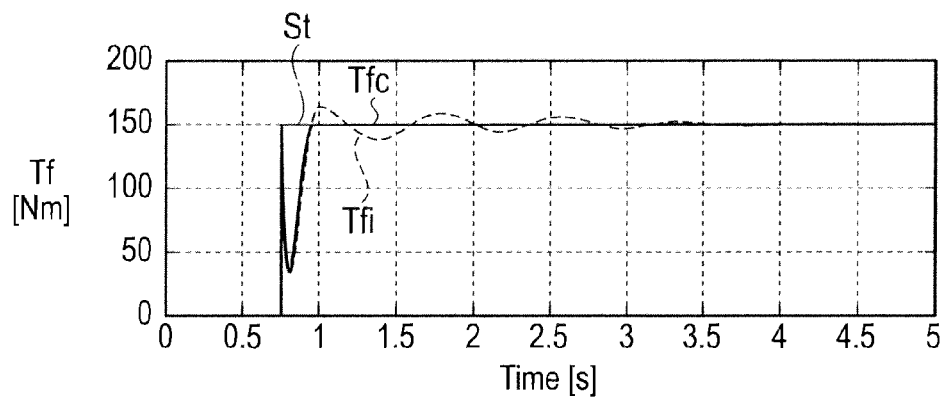
FIG. 16A to FIG. 16C show results of simulations where a vehicle model having a dead band is used as an actual plant Gp'(s).
Figure 16B:
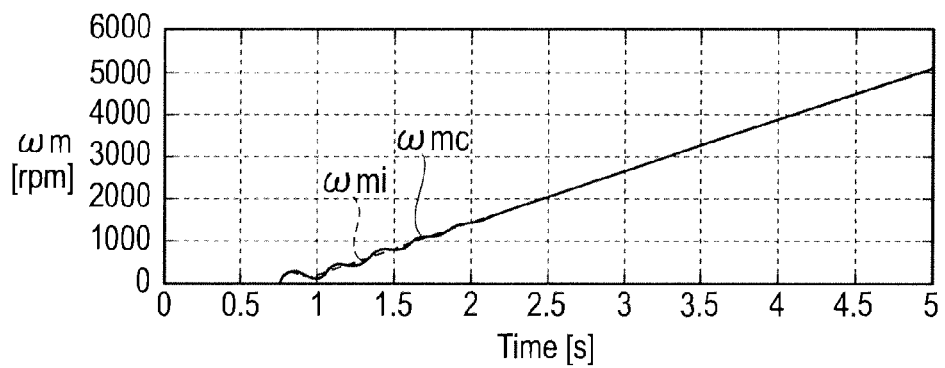
Figure 16C:
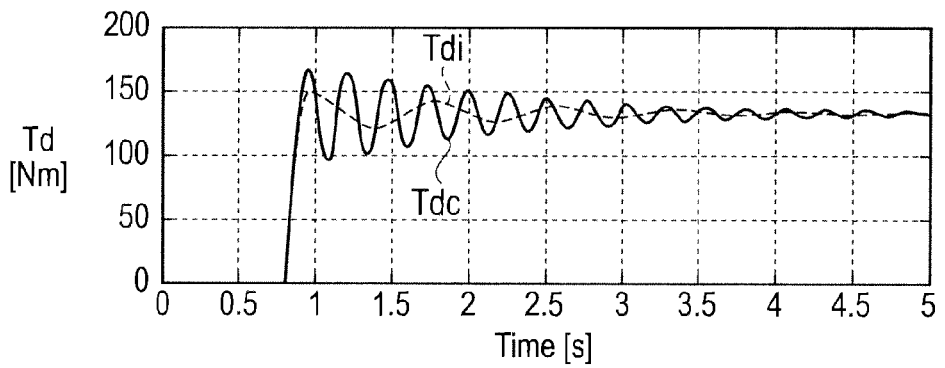

FIG. 16A to FIG. 16C show results of simulations where a vehicle model having a dead band of ±10 Nm at the drive shaft's transmission torque is used as the actual plant Gp'(s). FIG. 16A shows a transition of the output torque Tf, FIG. 16B shows a transition of the motor revolution speed ωm, and FIG. 16C shows a transition of the drive shaft's transmission torque Td. FIG. 16A to FIG. 16C show results of simulations at a start relative to a torque step command St from 0 Nm to 150 Nm. Herein, in each of the parameters Tf, ωm and Td, those added by "c" denote the result of the simulation where the control method according to the fifth embodiment using the filter expressed by the transmission characteristic Gz(s) is applied, while those added by "i" denote the result of simulation where the control method according to the fifth embodiment is not applied. Moreover, when the control method according to the fifth embodiment is applied, the above described attenuation coefficient ξc is set to 1.

As is obvious from FIG. 16A to FIG. 16C, when the control method according to the fifth embodiment is not applied, the vibration of each of the output torque Tfi and the drive shaft's transmission torque Tdi continues at about 1.3 Hz. On the other hand, when the control method according to the fifth embodiment is applied, the vibration of the output torque Tfc is suppressed at about 1.3 Hz. Herein, adding the control block 7h which is the filter expressed by the transmission characteristic Gz(s) decreases the effect of vibration damping at the to-be-controlled frequency, causing a vibration about 3.8 Hz to the drive shaft's transmission torque Tdc and the revolution speed come.

According to the fifth embodiment, as set forth above, the control block 7h provided with the filter expressed by the transmission characteristic Gz(s) including the numerator given by the second order expression and the denominator given by the second order expression is added. The control block 7h filters (third filtering treatment) the value which is obtained by subtracting the second paragraph Tm*2_2 of the second torque target value Tm*2 from the first paragraph Tm*2_1 of the second torque target value Tm*2 (that is, Tm*2_1−Tm*2_2), to thereby output the second torque target value Tm*2. Herein, the transmission characteristic Gz(s) of the control block 7h includes the numerator which is given by the second order expression of the numerator of the model Gp(s) and the denominator which is given by the second order expression having the attenuation coefficient ξc (second attenuation coefficient) which is set larger than the attenuation coefficient ξz (first attenuation coefficient) calculated from the numerator of the model Gp(s) and which is set less than or equal to 1 ξc (ξz<ξc≦1).

With the above structure, even when the vehicle transmission characteristic is deviated from the identification model Gp(s) thereof, the filtering function by the control block 7h cancels such deviation, thus suppressing the output torque's vibration caused by the feedback control. With this, the effect of vibration damping is obtained while preventing the occurrence of the torque vibration.

(Sixth Embodiment)

Hereinafter, the controller 5 of the electric vehicle according to a sixth embodiment of the present invention is to be set forth. The difference of the controller 5 according to the sixth embodiment from the controller 5 according to the fifth embodiment is the control method by the vibration damping controller 7. In addition, explanations about parts and portions common to those according to the fifth embodiment are to be omitted and therefore differences are mainly to be set forth hereafter.

Figure 17A:
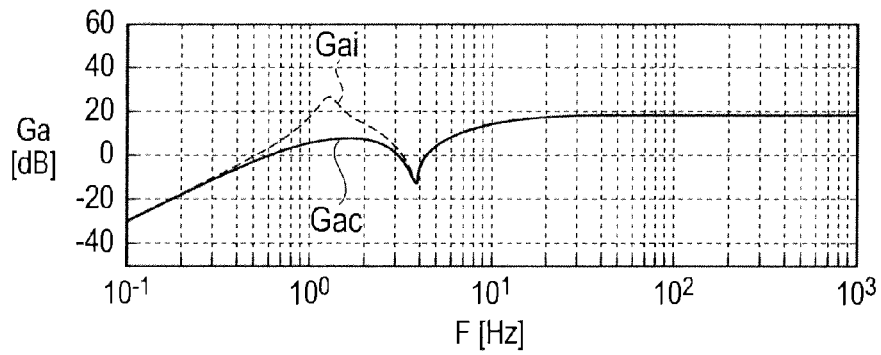
FIG. 17A to FIG. 17D are Bode diagrams of the transmission characteristic $H(s) \cdot s \times 1/(s \cdot Gp(s))$ as a result of frequency analysis, according to a fifth embodiment of the present invention.
Figure 17B:
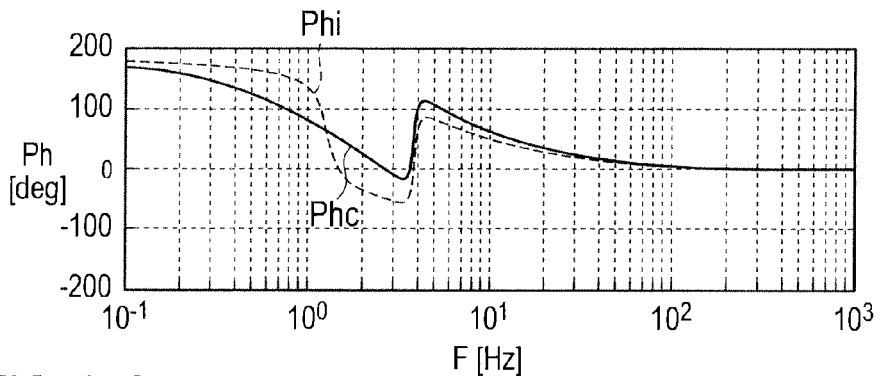
Figure 17C:
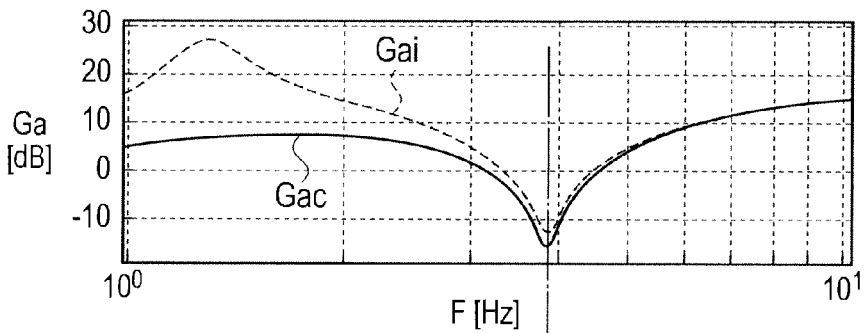
Figure 17D:
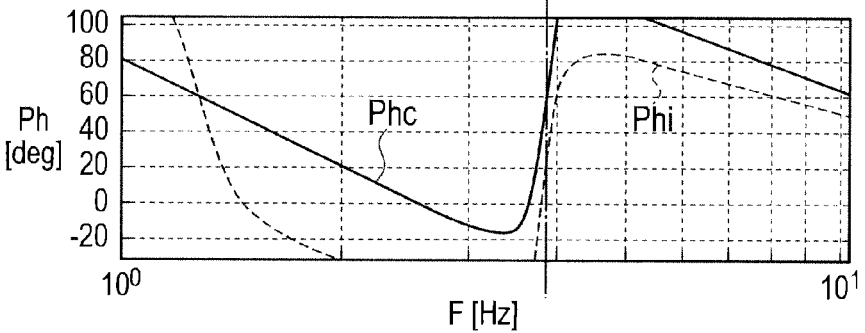

FIG. 17A to FIG. 17D are Bode diagrams of the transmission characteristic H(s)·s×1/(s·Gp(s)) as a result of frequency analysis. Herein, the transmission characteristic H(s)·s×1/(s·Gp(s)) is the one that is obtained by subjecting the transmission characteristic H(s)/Gp(s) to an equivalent conversion. FIG. 17A shows a gain Ga relative to a frequency F, FIG. 17B shows a phase Ph relative to the frequency F. Moreover, FIG. 17C shows a partly enlarged view of FIG. 17A, and FIG. 17D shows a partly enlarged view of FIG. 17B. Herein, in each of the parameters Ga and Ph, those added by "c" denote the simulation results obtained when the control method according to the fifth embodiment is applied, while those added by "i" denote the simulation results obtained when the control method according to the fifth embodiment is not applied. Moreover, when the control method according to the fifth embodiment is applied, the above described attenuation coefficient ξc is set to 1.

As is obvious from FIG. 17A to FIG. 17D, adding of the control block 7h (filter expressed by transmission characteristic Gz(s)) causes a gain difference of −1.9 dB and a phase difference of 33 deg at the to-be-controlled frequency (F=3.85 Hz), compared with when the control block 7h is not added. One of the features of the sixth embodiment is to correct the phase difference. Herein, the phase difference to be corrected is expressed by γ. According to the sixth embodiment, adding a phase compensator 7i implements the phase compensation of the phase difference γ, as shown in FIG. 18.

<First Example>

Figure 18:
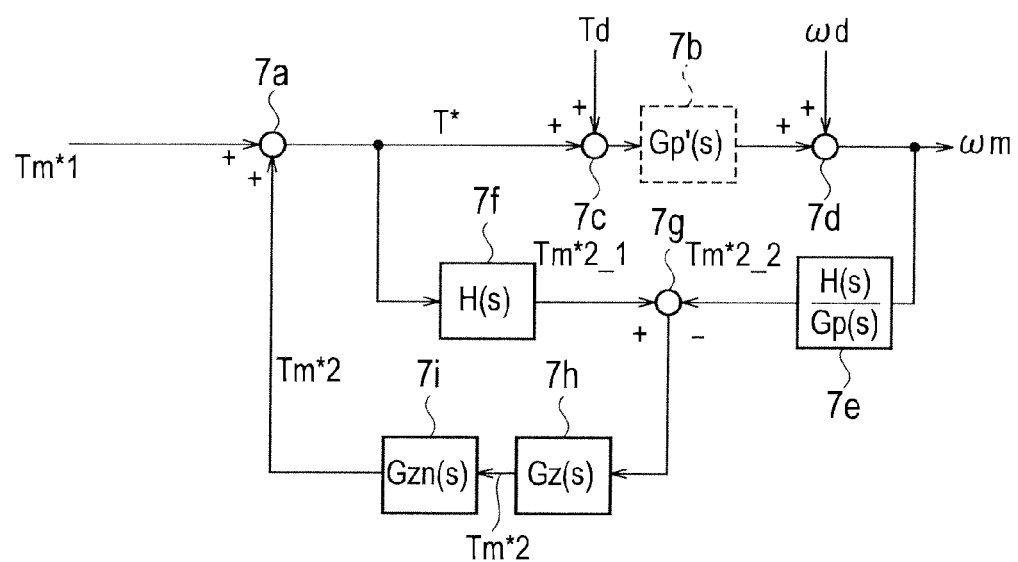
FIG. 18 is a block diagram showing a specific structure of the vibration damping controller, according to a first example of a sixth embodiment of the present invention.

FIG. 18 is a block diagram showing a specific structure of the vibration damping controller 7, according to a first example of the sixth embodiment of the present invention. With an output (second torque target value Tm*2) from the control block 7h as an input, the phase compensator 7i controls the phase of an arbitrary frequency, to thereby output the second torque target value Tm*2 whose phase is controlled. The outputted second torque target value Tm*2 is outputted to the adder 7a, as set forth above. Herein, the phase compensator 7i has a transmission characteristic expressed by Gzn(s) which is given, for example, by the following expression 22 (herein, T1 and T2 each denote a phase compensation constant).

$$Gzn(s) = \frac{1 + T2 \cdot s}{1 + T1 \cdot s}$$ [Expression 22]

Figure 19A:
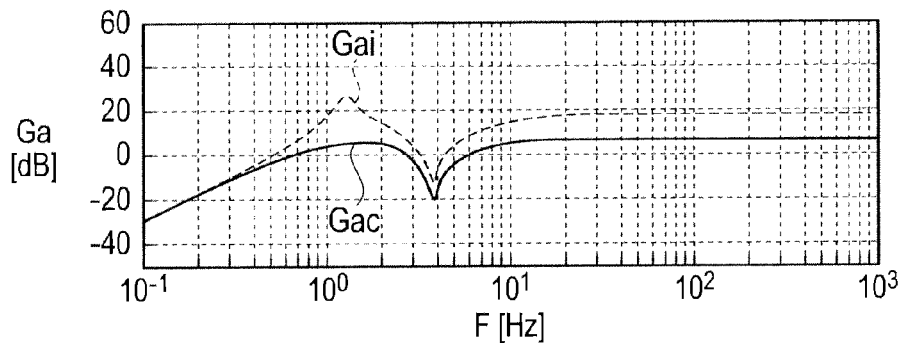
FIG. 19A to FIG. 19D are Bode diagrams of the transmission characteristic $H(s) \cdot s \times 1/(s \cdot Gp(s))$ as a result of frequency analysis, according to the first example of a sixth embodiment of the present invention.
Figure 19B:
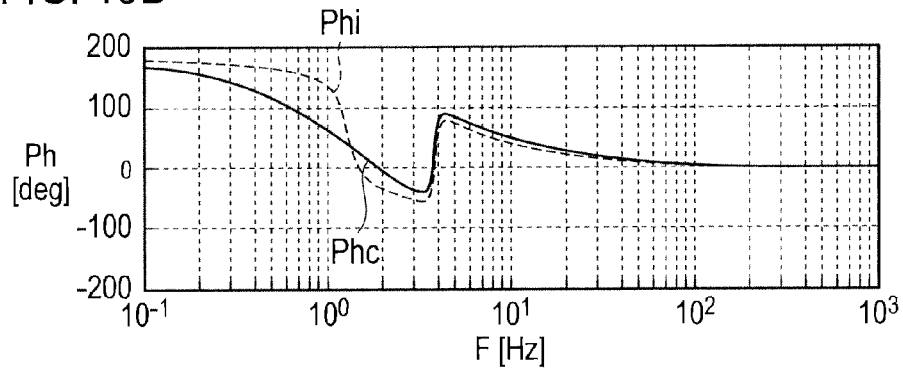
Figure 19C:
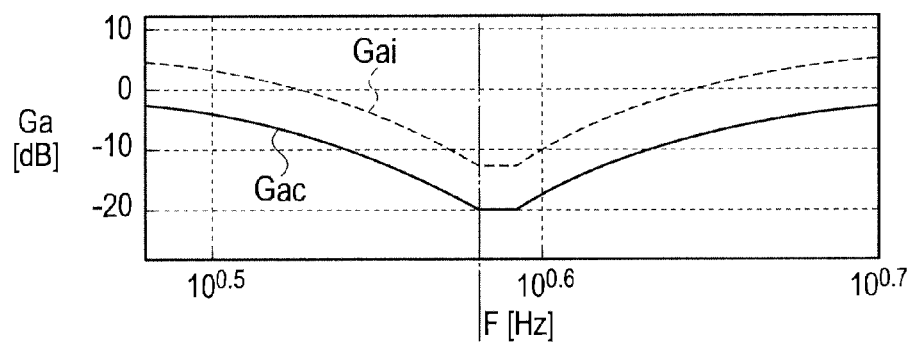
Figure 19D:
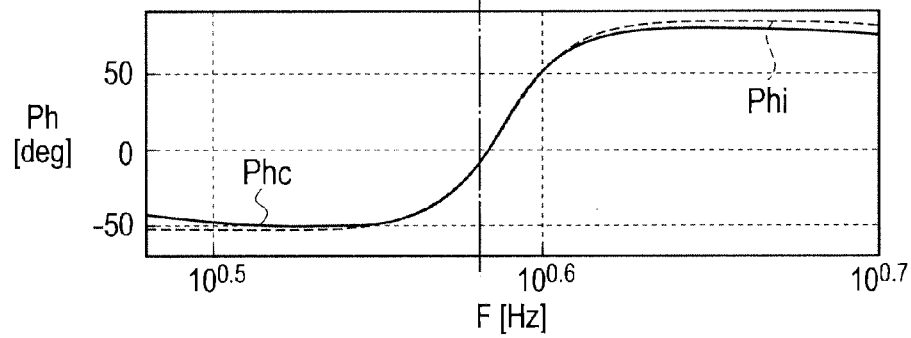

FIG. 19A to FIG. 19D are Bode diagrams of the transmission characteristic H(s)·s×1/(s·Gp(s)) as a result of frequency analysis, according to the first example of a sixth embodiment of the present invention. FIG. 19A shows a gain Ga relative to a frequency F, FIG. 19B shows a phase Ph relative to the frequency F. Moreover, FIG. 19C shows a partly enlarged view of FIG. 19A, and FIG. 19D shows a partly enlarged view of FIG. 19B. Herein, in each of the parameters Ga and Ph, those added by "c" denote the simulation results obtained when the control method according to the first example of the sixth embodiment (the control block 7h and the phase compensator 7i are added) is applied, while those added by "i" denote the simulation results obtained when the control method according to the first example of the sixth embodiment is not applied. Moreover, when the control method according to the first example of the sixth embodiment is applied, the phase compensator 7i delays the phase Ph by 33 deg at the to-be-controlled frequency (F=3.85 Hz) and the above described attenuation coefficient ξc is set to 1. As is obvious from FIG. 19D, the control method according to the first example of the sixth embodiment can compensate the phase difference at the to-be-controlled frequency (F=3.85 Hz). Moreover, the phase compensating by the phase compensator 7i causes a shift of −7.19 dB to the gain Ga at the to-be-controlled frequency (F=3.85 Hz).

<Second Example>

Figure 20:
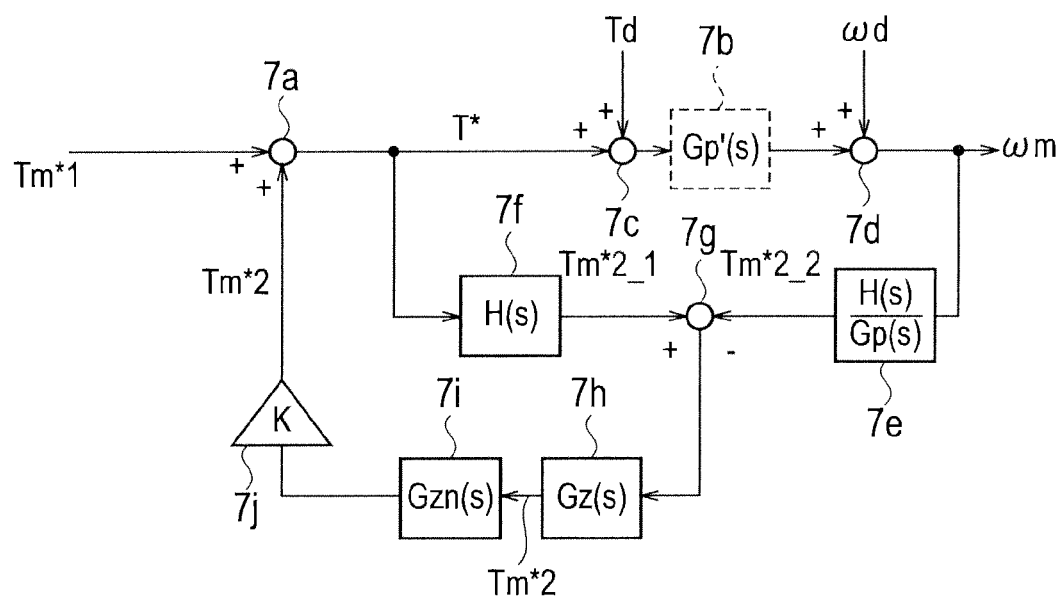
FIG. 20 is a block diagram showing a specific structure of a vibration damping controller, according to a second example of the sixth embodiment of the present invention.

FIG. 20 is a block diagram showing a specific structure of the vibration damping controller 7, according to a second example of the sixth embodiment of the present invention. According to the second example of the sixth embodiment, a block (gain compensator) 7j having a gain K is further added after the phase compensator 7i, so as to compensate the gain difference. Then, adjusting the gain K compensates the gain difference at the to-be-controlled frequency (F=3.85 Hz).

Figure 21A:
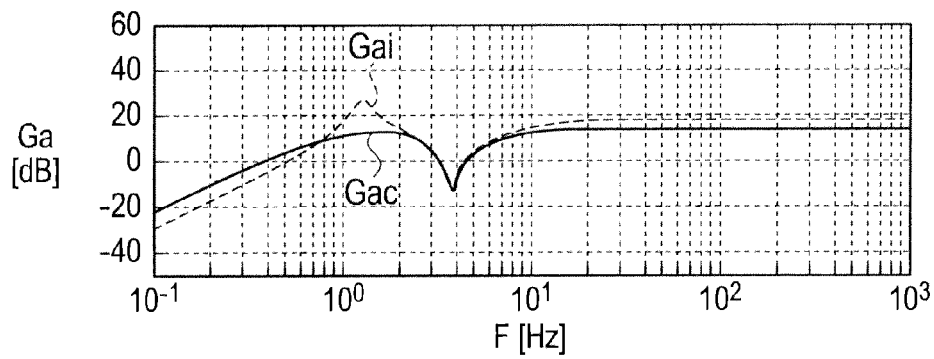
FIG. 21A to FIG. 21D are Bode diagrams of the transmission characteristic $H(s) \cdot s \times 1/(s \cdot Gp(s))$ as a result of frequency analysis, according to the second example of the sixth embodiment of the present invention.
Figure 21B:
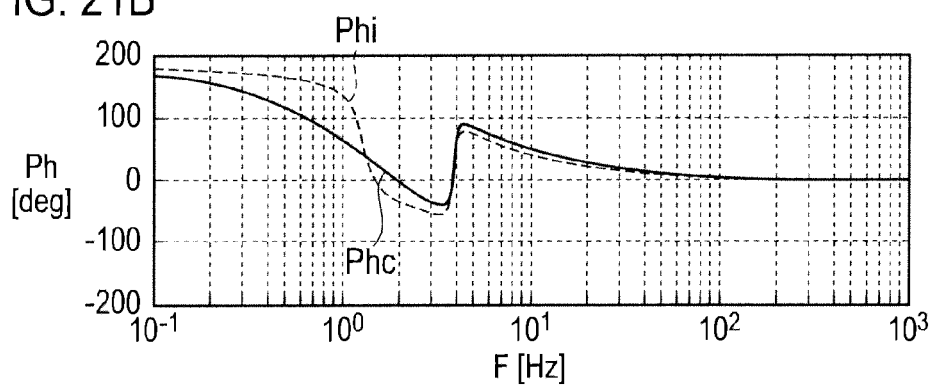
Figure 21C:
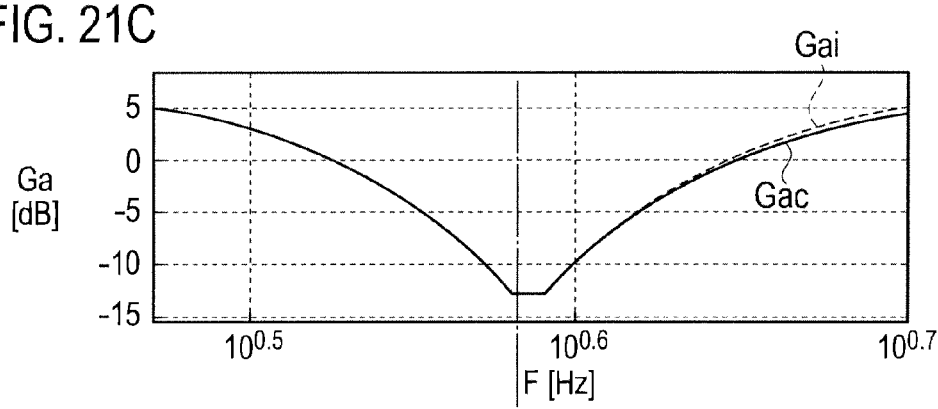
Figure 21D:
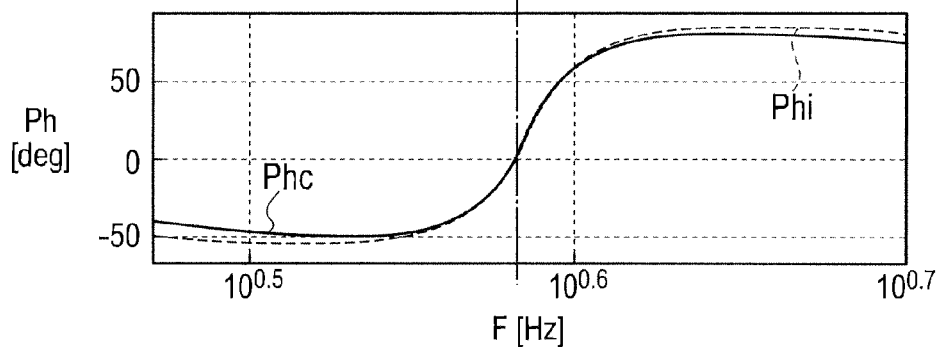

FIG. 21A to FIG. 21D are Bode diagrams of the transmission characteristic H(s)·s × 1/(s·Gp(s)) as a result of frequency analysis, according to the second example of the sixth embodiment of the present invention. FIG. 21A shows a gain Ga relative to a frequency F, FIG. 21B shows a phase Ph relative to the frequency F. Moreover, FIG. 21C shows a partly enlarged view of FIG. 21A, and FIG. 21D shows a partly enlarged view of FIG. 21B. Herein, in each of the parameters Ga and Ph, those added by "c" denote the simulation results obtained when the control method according to the second example of the sixth embodiment (the control block 7h, the phase compensator 7i and the block 7j which has the gain K are added) is applied, while those added by "i" denote the simulation results obtained when the control method according to the second example of the sixth embodiment is not applied. Moreover, when the control method according to the second example of the sixth embodiment is applied, the phase compensator 7i delays the phase Ph by 33 deg at the to-be-controlled frequency (F=3.85 Hz) and the above described attenuation coefficient ξc is set to 1. As is obvious from FIG. 21A and FIG. 21C, adding of the gain K can suppress the gain difference at the to-be-controlled frequency (F=3.85 Hz).

Figure 22A:
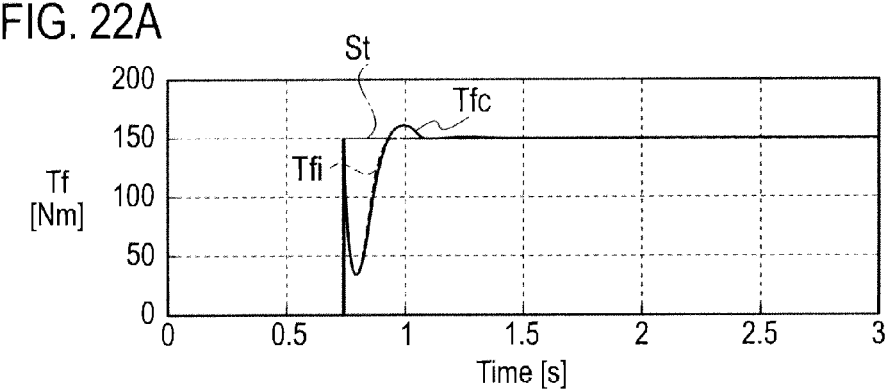
FIG. 22A to FIG. 22D show results of simulations where a vehicle model having a dead band is used as an actual plant Gp'(s).
Figure 22B:
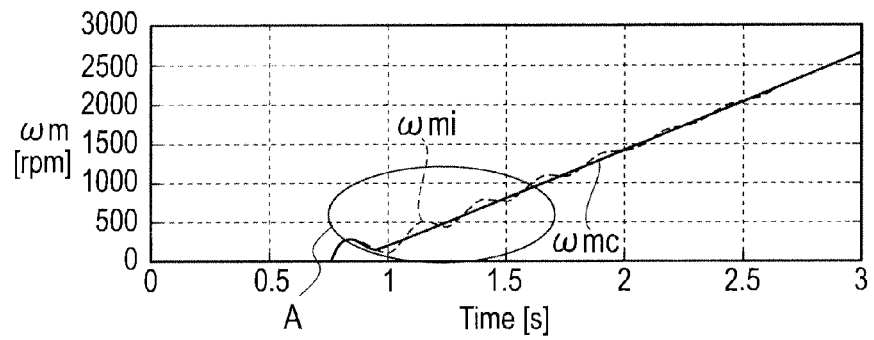
Figure 22C:
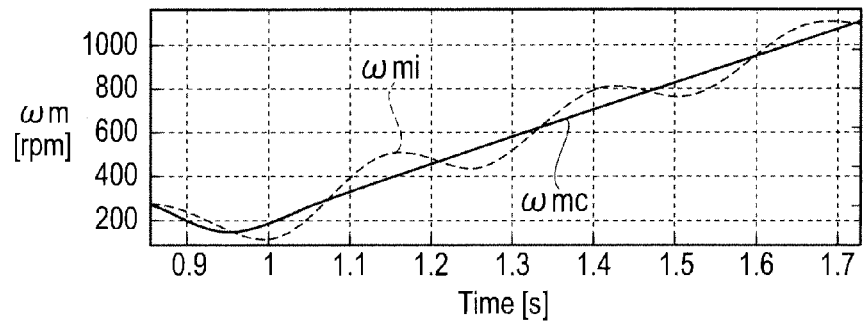
Figure 22D:
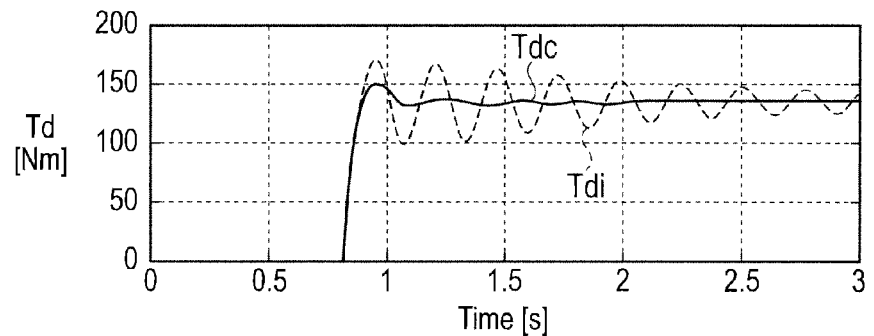

FIG. 22A to FIG. 22D show results of simulations where a vehicle model having a dead band of ±10 Nm at the drive shaft's transmission torque is used as the actual plant Gp'(s). FIG. 22A shows a transition of the output torque Tf, while FIG. 22B shows a transition of the motor revolution speed cum. Moreover, FIG. 22C shows an enlarged view of an area A of FIG. 22B, while FIG. 22D shows a transition of the drive shaft's transmission torque Td. FIG. 22A to FIG. 22D show results of simulations at a start relative to a torque step command St from 0 Nm to 150 Nm. Herein, in each of the parameters Tf, cum and Td, those added by "c" denote the result of the simulation where the control method according to the sixth embodiment is applied, while those added by "i" denote the result of simulation where the control method according to the sixth embodiment is not applied.

As is obvious from FIG. 22A to FIG. 22D, when the control method according to the sixth embodiment is applied, compared with when the control method according to the sixth embodiment is not applied, the vibration of each of the output torque Tfc, the drive shaft's transmission torque Tdc and the motor revolution speed ωmc is suppressed.

As set forth above, according to the first and second examples of the sixth embodiment, the phase compensator 7i for compensating the phase Ph at the to-be-controlled frequency (F=3.85 Hz) is added after the control block 7h. The phase compensator 7i implements the phase compensation of the second torque target value Tm*2 which was subjected to the third filtering treatment by means of the control block 7h. The above structure suppresses the vibration of the output torque, while improving the effect of preventing vibration.

Moreover, according to the second example of the sixth embodiment, the block 7j having the gain K for compensating the gain at the to-be-controlled frequency (F=3.85 Hz) is added after the control block 7h. The block 7j implements the gain compensation of the second torque target value Tm*2 which was subjected to the third filtering treatment by means of the control block 7h. The above structure suppresses the vibration of the output torque, while further improving the effect of preventing vibration.

(Seventh Embodiment)

Hereinafter, the controller 5 of the electric vehicle according to a seventh embodiment of the present invention is to be set forth. The difference of the controller 5 according to the seventh embodiment from the controller 5 according to the fifth embodiment is the control method by the vibration damping controller 7. In addition, explanations about parts and portions common to those according to the fifth embodiment are to be omitted and therefore differences are mainly to he set forth hereafter.

Figure 23:
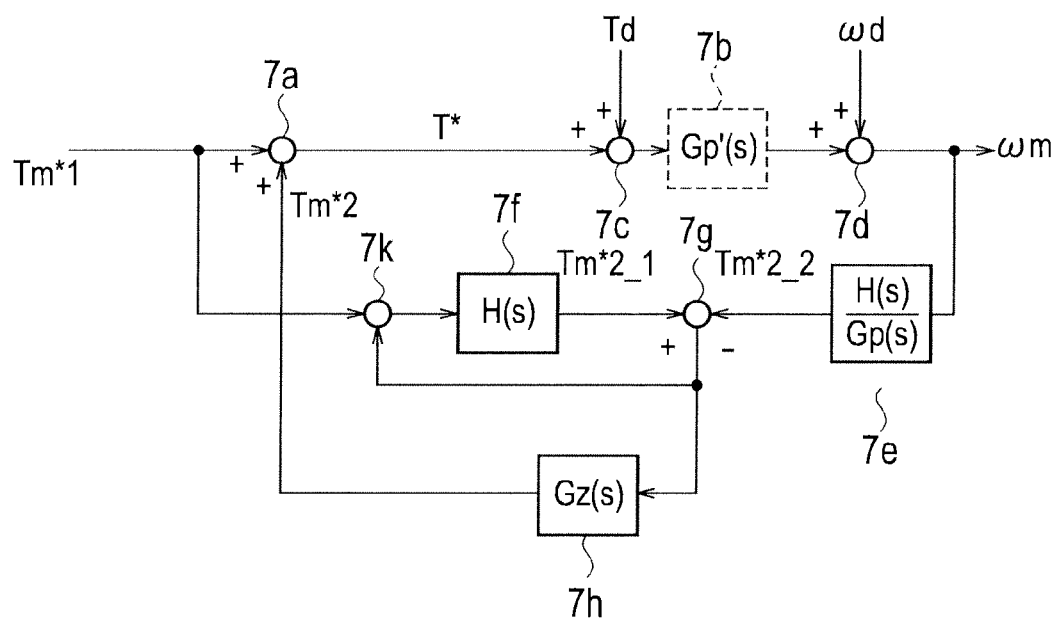
FIG. 23 is a block diagram showing a specific structure of the vibration damping controller, according to a seventh embodiment of the present invention.

FIG. 23 is a block diagram showing a specific structure of the vibration damping controller 7, according to the seventh embodiment of the present invention. According to the seventh embodiment, the control block 7h as a filter expressed by the transmission characteristic Gz(s) is applied only to the actual output torque. Moreover, the first torque target value Tm*1 added by the subtractor 7g's output value (Tm*2_1−Tm*2_2) by means of the adder 7k is inputted to the control block 7f for calculating the first paragraph Tm*2_1 of the second torque target value Tm*2.

Figure 24A:
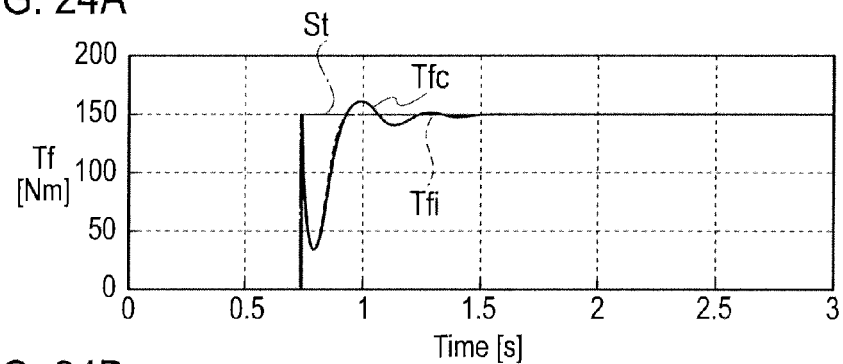
Figure 24B:
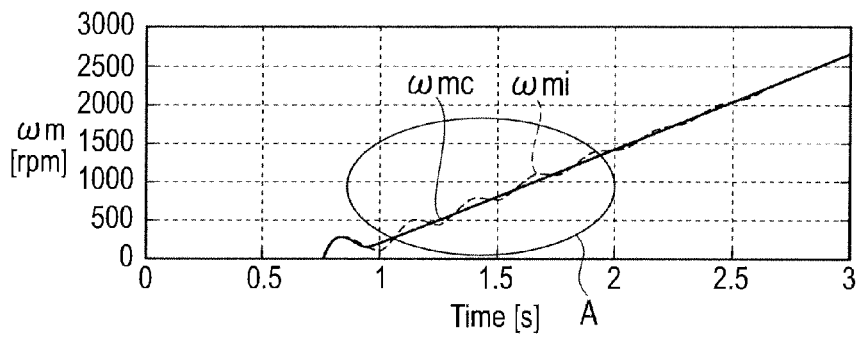
Figure 24C:
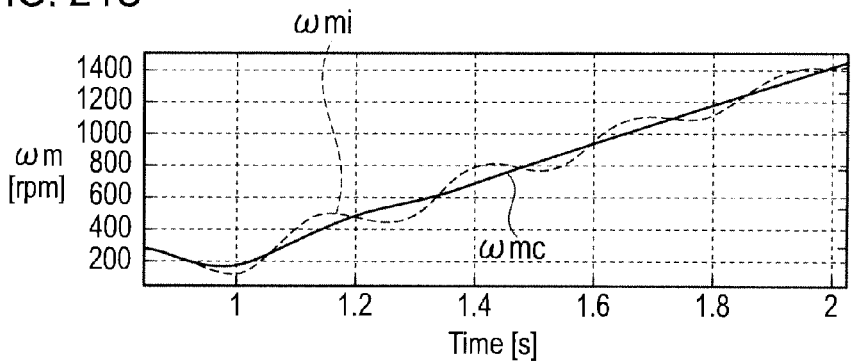
Figure 24D:
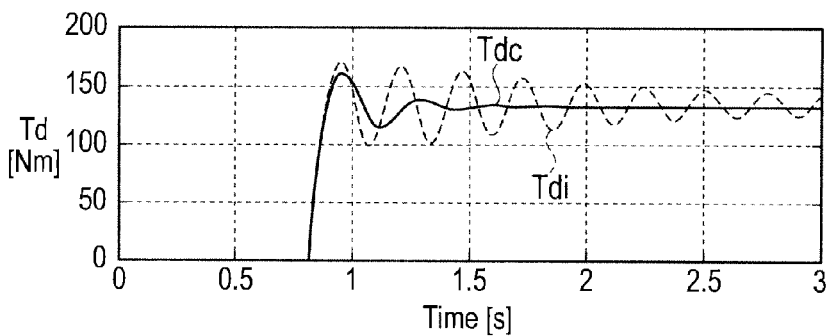

FIG. 24A to FIG. 24D show results of simulations where a vehicle model having a dead band of ±10 Nm at the drive shaft's transmission torque is used as the actual plant Gp'(s). FIG. 24A denotes a transition of the output torque Tf, FIG. 24B shows a transition of the motor revolution speed ωm. Moreover, FIG. 24C shows an enlarged view of an area A of FIG. 24B, and FIG. 24D shows a transition of the drive shaft's transmission torque Td. FIG. 24A to FIG. 24D show results of simulations at a start relative to a torque step command St from 0 Nm to 150 Nm. Herein, in each of the parameters Tf, ωm and Td, those added by "c" denote the result of the simulation where the control method according to the seventh embodiment {where the filter (transmission characteristic Gz(s)) is applied only to the actual output torque} is applied, while those added by "i" denote the result of simulation where the control method according to seventh embodiment is not applied.

As is obvious from FIG. 24A to FIG. 24D, when the control method according to the seventh embodiment is applied, compared with when the control method according to the seventh embodiment is not applied, the vibration of each of the output torque Tfc, the drive shaft's transmission torque Tdc and the motor revolution speed come is suppressed.

As set forth above, according to the seventh embodiment, based on the addition obtained by adding the difference (between first paragraph Tm*2_1 of the second torque target value Tm*2 and the second paragraph Tm*2_2 of the second torque target value Tm*2, that is, Tm*2_1−Tm*2_2) to the first torque target value Tm*1 which is set by the torque setter 6, the control block 7f calculates the first paragraph Tm*2_1 of the second torque target value Tm*2. With the above structure, the control block 7h (filter of transmission characteristic Gz(s)) is used only for calculating the torque command value T*, and the input value to the control block 7h is used for calculating the feedback control system. With this, the vibration of the output torque is suppressed, while further improving the effect of preventing vibration.

In addition, although the seventh embodiment has been set forth based on the structure in FIG. 15 according to the fifth embodiment, the control method according to the seventh embodiment may also be applied to the structures in FIG. 18 and FIG. 20 according to the sixth embodiment.

(Eighth Embodiment)

Hereinafter, the controller 5 of the electric vehicle according to an eighth embodiment of the present invention is to be set forth. The difference of the controller 5 according to the eighth embodiment from the controller 5 according to the fifth embodiment is the control method by the vibration damping controller 7. In addition, explanations about parts and portions common to those according to the fifth embodiment are to be omitted and therefore differences are mainly to be set forth hereafter.

Figure 25:
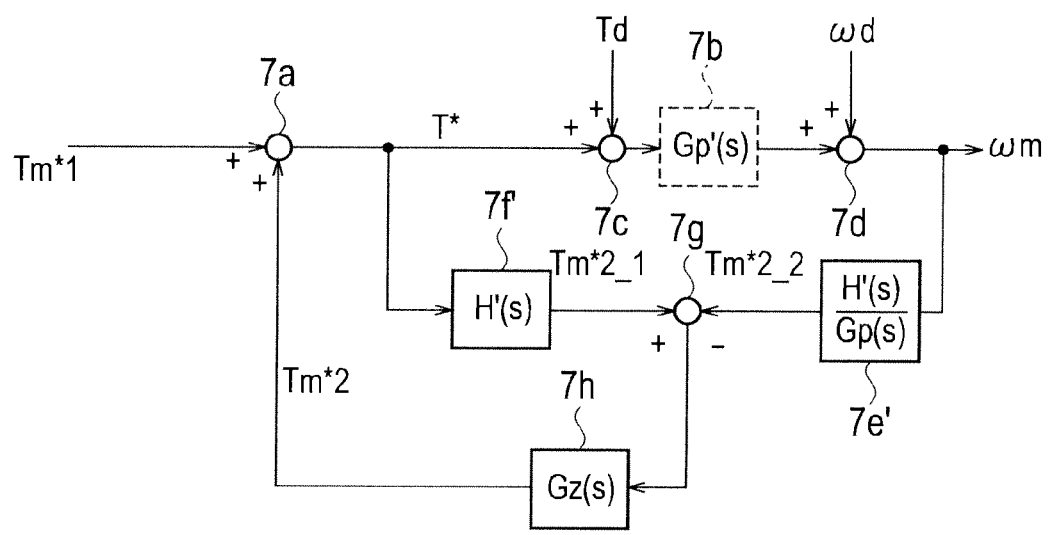
FIG. 25 is a block diagram showing a specific structure of the vibration damping controller, according to an eighth embodiment of the present invention.

FIG. 25 is a block diagram showing a specific structure of the vibration damping controller 7, according to the eighth embodiment of the present invention. One of the features of the eighth embodiment is that the phase difference γ caused by adding the control block 7h (filter of transmission characteristic Gz(s)) is compensated by substituting the transmission characteristic H(s) of each of the control blocks 7e, 7f with a transmission characteristic H'(s). In FIG. 25, the control blocks 7e, 7f where the transmission characteristic H(s) is substituted with the transmission characteristic H'(s) are respectively expressed by control blocks 7e', 7f'.

According to the fifth embodiment, the center frequency of the band pass filter as the transmission characteristic H(s) coincides with a torsional resonant frequency of a driving system of the vehicle. According to the eighth embodiment, the center frequency of the transmission characteristic H(s) is shifted by an amount equivalent to a certain frequency, to thereby obtain the transmission characteristic H'(s). Use of the transmission characteristic H'(s) implements a phase compensation by an amount equivalent to the phase difference γ.

In the case that the band pass filter is combined with a first order high pass filter and a first order low pass filter, a transmission function thereof is given by the following expression 23.

$$\left(\frac{\omega c}{\omega c + s}\right) \times \left(\frac{s}{\omega c + s}\right) = \frac{\omega c \times s}{(\omega c + s)^2} \quad \text{[Expression 23]}$$

Herein, ωc which is given by (fc(Hz)=ωc(rad/s)/2π) denotes a parameter corresponding to the center frequency fc after the phase compensation when the torsional resonant frequency is given by fp (fc(Hz)=ωp(rad/s)/2π.

Then, substituting "s" on the eight side of the expression 23 with "j×ωp" brings about the following expression 24.

$$\frac{\omega c \times j \times \omega p}{(\omega c^2 - \omega p^2) + (2 \times \omega c \times \omega p) \times j} \quad \text{[Expression 24]}$$

On the right side (derived from the expression 23) shown in the expression 24, multiplying the denominator with each of the numerator and denominator changes the above right side to the following expression 25:

$$\frac{2 \times \omega c^2 \times \omega p^2}{(\omega c^2 + \omega p^2)^2} + \frac{(\omega c^2 - \omega p^2) \times \omega c \times \omega p}{(\omega c^2 + \omega p^2)^2} \times j \quad \text{[Expression 25]}$$

Herein, the right side shown in the expression 25 is substituted with C+D·j, to thereby allow tan γ to meet the following expression 26:

$$\tan \gamma = \frac{D}{C}$$
$$= \frac{(\omega c^2 - \omega p^2) \times \omega c \times \omega p}{2 \times \omega c^2 \times \omega p^2}$$
$$= \frac{\omega c^2 - \omega p^2}{2 \times \omega c \times \omega p} \quad \text{[Expression 26]}$$

The expression 26 can be changed to the following expression 27:

$$\omega c^2 + 2 \times \omega c \times \omega p \times \tan \gamma - \omega p^2 = 0 \quad \text{[Expression 27]}$$

From the expression 27, we meets the following expression 28:

$$\omega c = \frac{-2\tan \gamma \times \omega p + \sqrt{(-2\tan \gamma \times \omega p)^2 + 4\omega p^2}}{2} \quad \text{[Expression 28]}$$

With this, based on ωc in the expression 28, a center frequency fc' of the transmission function H'(s) can be calculated (fc'(Hz)=ωc(rad/s)/2π). In this case, the transmission characteristic H'(s) is so set as to correct the above shift of the gain.

Figure 26A:
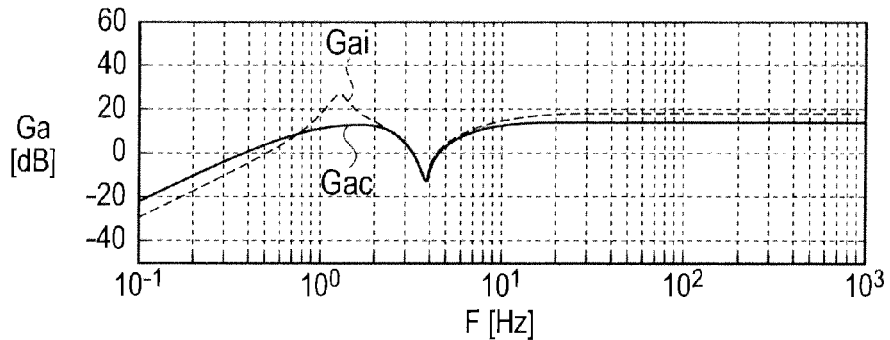
FIG. 26A to FIG. 26D are Bode diagrams of the transmission characteristic $H(s) \cdot s \times 1/(s \cdot Gp(s))$ as a result of frequency analysis, according to the eighth embodiment of the present invention.
Figure 26B:
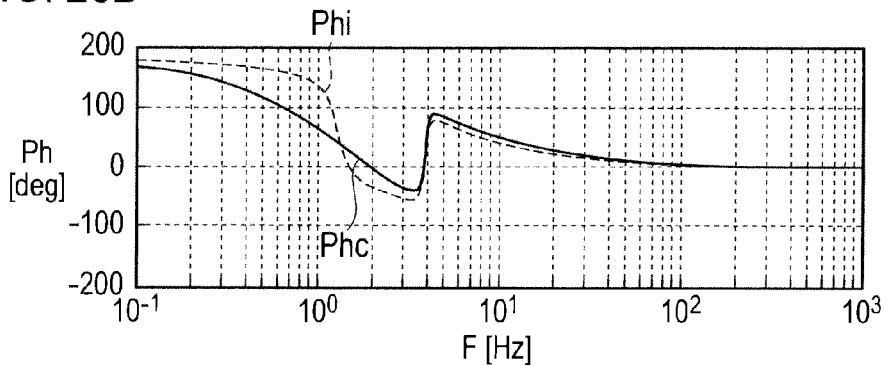
Figure 26C:
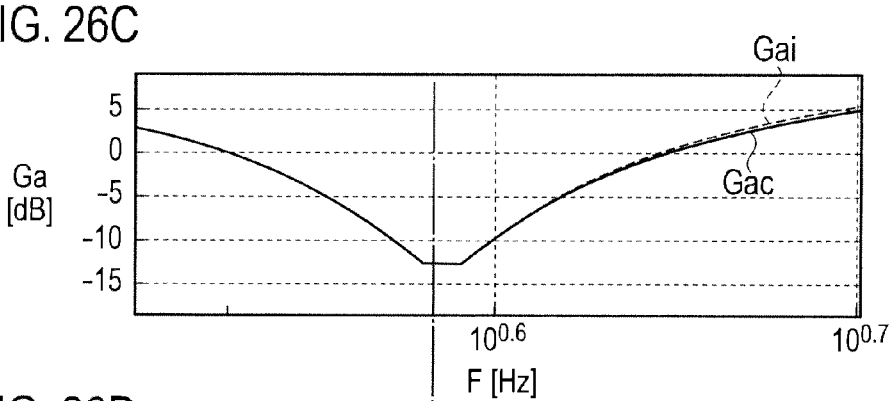
Figure 26D:
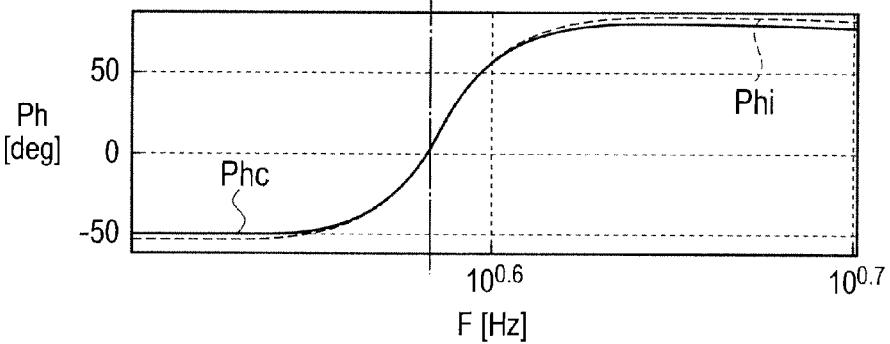

FIG. 26A to FIG. 26D are Bode diagrams of the transmission characteristic H(s)·s×1/(s·Gp(s)) as a result of frequency analysis, according to the eighth embodiment of the present invention. FIG. 26A shows a gain Ga relative to a frequency F, FIG. 26B shows a phase Ph relative to the frequency F. Moreover, FIG. 26C shows a partly enlarged view of FIG. 26A, and FIG. 26D shows a partly enlarged view of FIG. 26B. Herein, in each of the parameters Ga and Ph, those added by "c" denote the simulation results obtained when the control method according to the eighth embodiment {the control block 7h is added and the transmission function H(s) is substituted with the transmission function H'(s)} is applied, while those added by "i" denote the simulation results obtained when the control method according to the eighth embodiment is not applied. Moreover, when the control method according to the eighth embodiment is applied, the above ξ is set to 1. As is obvious from FIG. 26D, according to the eighth embodiment, the phase difference and gain difference at the to-be-controlled frequency (F=3.85 Hz) can be corrected.

Figure 27A:
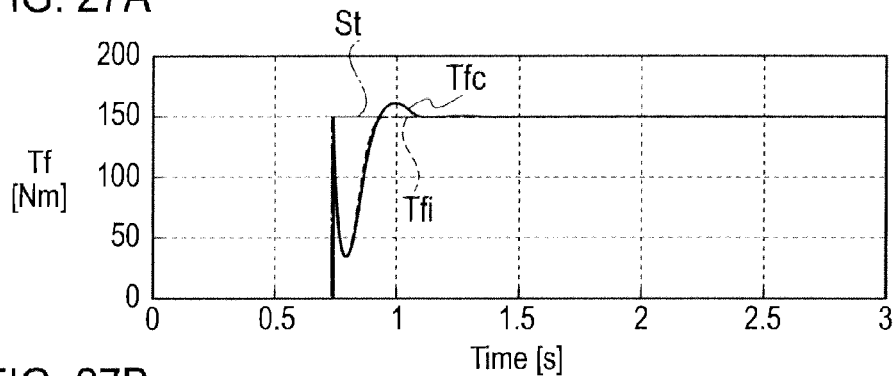
FIG. 27A to FIG. 27D show results of simulations where a vehicle model having a dead band is used as an actual plant Gp'(s).
Figure 27B:
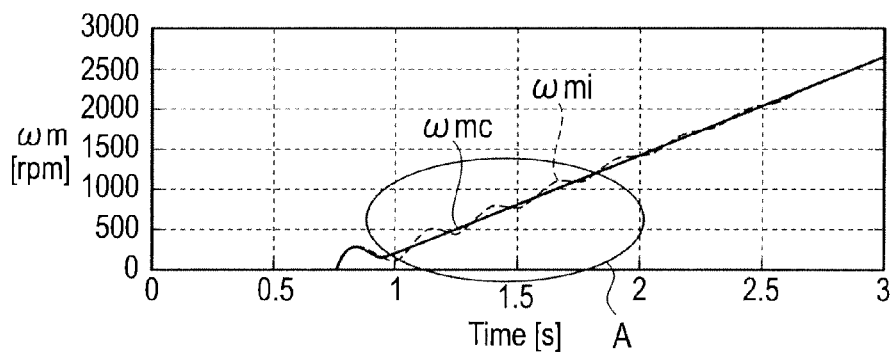
Figure 27C:
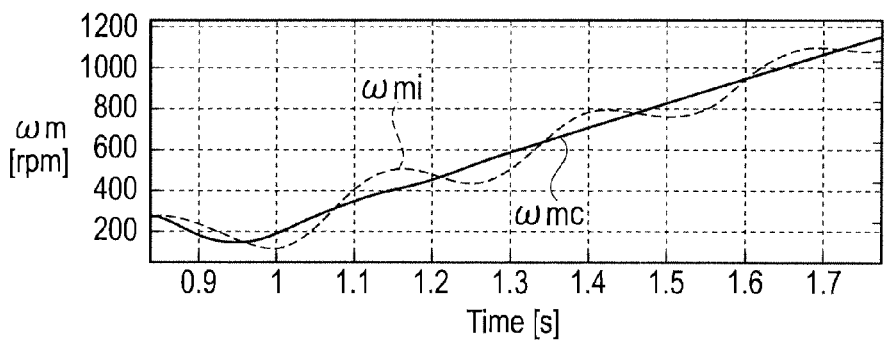
Figure 27D:
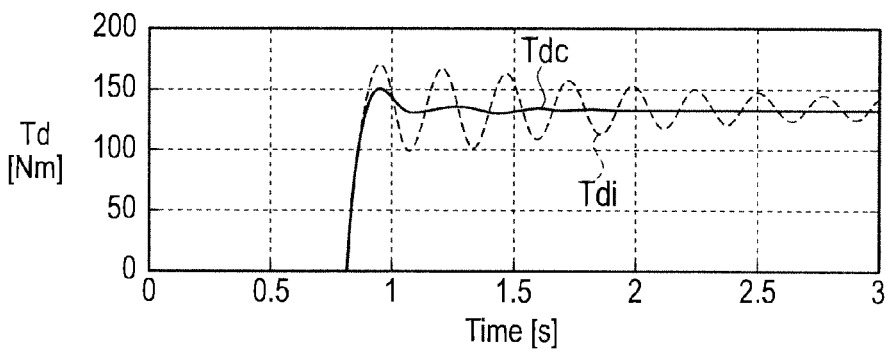

FIG. 27A to FIG. 27D show results of simulations where a vehicle model having a dead band of ±10 Nm at the drive shaft's transmission torque is used as the actual plant Gp'(s). FIG. 27A shows a transition of the output torque Tf, while FIG. 27B shows a transition of the motor revolution speed ωm. Moreover, FIG. 27C shows an enlarged view of an area A of FIG. 27B, while FIG. 27D shows a transition of the drive shaft's transmission torque Td. FIG. 27A to FIG. 27D show results of simulations at a start relative to a torque step command St from 0 Nm to 150 Nm. Herein, in each of the parameters Tf, ωm and Td, those added by "c" denote the result of the simulation where the control method according to the eighth embodiment is applied, while those added by "i" denote the result of simulation where the control method according to the eighth embodiment is not applied.

As is obvious from FIG. 27A to FIG. 27D, when the control method according to the eighth embodiment is applied, compared with when the control method according to the eighth embodiment is not applied, the vibration of each of the output torque Tfc, the drive shaft's transmission torque Tdc and the motor revolution speed come is suppressed.

As set forth above, according to the eighth embodiment, the control block $7f'$ and the control block $7e'$ make variable the frequency characteristic (center frequency fc) at the transmission characteristic H(s) having the band pass filter (that is, fc changed to fc' and H(s) changed to H'(s)), to thereby correct the phase at the to-be-controlled frequency (F=3.85 Hz). The above structure suppresses the vibration of the output torque, while further improving the effect of preventing vibration.

Under the present invention, the attenuation coefficient of the model of the transmission characteristic at the second filtering treatment (H(s)/Gp(s)) is substituted with a value which is larger than the identification value of the model (Gp(s)) of the transmission characteristic (Gp(s)). With this, the torque vibration can be prevented even when the vehicle transmission characteristic is deviated from the identification model (Gp(s)) thereof.

Moreover, under the present invention, even when the vehicle transmission characteristic is deviated from the identification model Gp(s) thereof, the filtering function by the filter cancels such deviation, thus suppressing the output torque's vibration caused by the feedback control. With this, the effect of vibration damping is obtained, while preventing the occurrence of the torque vibration.

Although the present invention has been described above by reference to certain embodiments, the present invention is not limited to the embodiments described above. Modifications and variations of the embodiment(s) described above will occur to those skilled in the art, in light of the above teachings.

This application is based on a prior Japanese Patent Application No. P2009-125463 (filed May 25, 2009 in Japan) and a prior Japanese Patent Application No. P2009-138484 (filed Jun. 9, 2009 in Japan). The entire contents of the Japanese Patent Application Nos. P2009-125463 and P2009-138484 from which priorities are claimed are incorporated herein by reference, in order to take some protection against translation errors or omitted portions.

The scope of the present invention is defined with reference to the following claims.

What is claimed is:

1. A controller of an electric vehicle having as a power source an electric motor driven based on a torque command value, the controller comprising:
   a sensor for sensing vehicle information;
   a torque target value setter for setting a first torque target value based on the vehicle information;
   a torque command value calculator for calculating the torque command value to the electric motor;
   a first paragraph calculator for calculating a first paragraph of a second torque target value by implementing a first filtering treatment of the torque command value, the first filtering treatment including a transmission characteristic having a band pass filter characteristic;
   a second paragraph calculator for calculating a second paragraph of the second torque target value by implementing a second filtering treatment of a motor revolution speed which is one of pieces of the vehicle information, the second filtering treatment including:
      the transmission characteristic having the band pass filter characteristic, and
      a model of a transmission characteristic between:
         a torque input to the vehicle, and
         the motor revolution speed;
   a torque target value calculator for calculating the second torque target value based on a deviation between:
      the first paragraph of the second torque target value, and
      the second paragraph of the second torque target value,
   wherein
   based on the first torque target value and the second torque target value, the torque command value calculator calculates the torque command value, and
   in the second filtering treatment, the second paragraph calculator uses an attenuation coefficient which is set larger than an identification value of the model of the transmission characteristic.

2. The controller of the electric vehicle according to claim 1, wherein
   the second paragraph calculator has a correction function to correct a shift of the frequency characteristic of the second filtering treatment at a to-be-controlled frequency, and
   the second paragraph calculator corrects a center frequency of the transmission characteristic having the band pass filter characteristic, to thereby correct a phase at the to-be-controlled frequency.

3. The controller of the electric vehicle according to claim 1, wherein
   the second paragraph calculator has a correction function to correct a shift of the frequency characteristic of the second filtering treatment at a to-be-controlled frequency, and
   the second paragraph calculator varies a frequency of a resonant frequency characteristic of the second filtering treatment, to thereby correct a phase at the to-be-controlled frequency.

4. The controller of the electric vehicle according to claim 1, wherein
   the second paragraph calculator has a correction function to correct a shift of the frequency characteristic of the second filtering treatment at a to-be-controlled frequency, and
   the second paragraph calculator corrects a gain of the transmission characteristic having the band pass filter characteristic, to thereby correct the gain at the to-be-controlled frequency.

5. A method of controlling an electric vehicle having as a power source an electric motor driven based on a torque command value, the controlling method comprising:
   sensing vehicle information;
   setting a first torque target value based on the vehicle information;
   calculating the torque command value to the electric motor;
   calculating a first paragraph of a second torque target value by implementing a first filtering treatment of the torque command value, the first filtering treatment including a transmission characteristic having a band pass filter characteristic;

calculating a second paragraph of the second torque target value by implementing a second filtering treatment of a motor revolution speed which is one of pieces of the vehicle information, the second filtering treatment including:
the transmission characteristic having the band pass filter characteristic, and
a model of a transmission characteristic between:
a torque input to the vehicle, and
the motor revolution speed;

calculating the second torque target value based on a deviation between:
the first paragraph of the second torque target value, and
the second paragraph of the second torque target value, wherein based on the first torque target value and the second torque target value, the torque command value calculating operation calculates the torque command value, and in the second filtering treatment, the second paragraph calculating operation uses an attenuation coefficient which is set larger than an identification value of the model of the transmission characteristic.

6. A controller of an electric vehicle having as a power source an electric motor driven based on a torque command value, the controller comprising:
a sensing means for sensing vehicle information;
a torque target value setting means for setting a first torque target value based on the vehicle information;
a torque command value calculating means for calculating the torque command value to the electric motor;
a first paragraph calculating means for calculating a first paragraph of a second torque target value by implementing a first filtering treatment of the torque command value, the first filtering treatment including a transmission characteristic having a band pass filter characteristic;
a second paragraph calculating means for calculating a second paragraph of the second torque target value by implementing a second filtering treatment of a motor revolution speed which is one of pieces of the vehicle information, the second filtering treatment including:
the transmission characteristic having the band pass filter characteristic, and
a model of a transmission characteristic between:
a torque input to the vehicle, and
the motor revolution speed;
a torque target value calculating means for calculating the second torque target value based on a deviation between:
the first paragraph of the second torque target value, and
the second paragraph of the second torque target value, wherein based on the first torque target value and the second torque target value, the torque command value calculating means calculates the torque command value, and in the second filtering treatment, the second paragraph calculating means uses an attenuation coefficient which is set larger than an identification value of the model of the transmission characteristic.

7. A controller of an electric vehicle having as a power source an electric motor driven based on a torque command value, the controller comprising:
a sensor for sensing vehicle information;
a torque target value setter for setting a first torque target value based on the vehicle information;
a torque command value calculator for calculating the torque command value to the electric motor;
a first paragraph calculator for calculating a first paragraph of a second torque target value by implementing a first filtering treatment of the torque command value, the first filtering treatment including a transmission characteristic having a band pass filter characteristic;
a second paragraph calculator for calculating a second paragraph of the second torque target value by implementing a second filtering treatment of a motor revolution speed which is one of pieces of the vehicle information, the second filtering treatment including:
a transmission characteristic having the band pass filter characteristic, and
a model of a transmission characteristic between:
a torque input to the vehicle, and
the motor revolution speed;
a torque target value calculator for calculating the second torque target value based on a deviation between:
the first paragraph of the second torque target value, and
the second paragraph of the second torque target value, wherein the model includes a numerator given by a second order expression and a denominator given by a third order expression, the torque target value calculator includes:
a subtractor for subtracting the second paragraph of the second torque target value from the first paragraph of the second torque target value, and
a filter for outputting the second torque target value by implementing a third filtering treatment of an output value of the subtractor, the third filtering treatment including a transmission characteristic including a numerator given by a second order expression and a denominator given by a second order expression, the transmission characteristic of the filter includes:
the numerator which is given by the second order expression of the numerator of the model, and
the denominator which is given by the second order expression having a second attenuation coefficient, the second attenuation coefficient being set larger than a first attenuation coefficient calculated from the numerator of the model and being set less than or equal to 1, and the torque command value calculator calculates the torque command value based on:
the first torque target value, and
the second torque target value subjected to the third filtering treatment by the filter.

8. The controller of the electric vehicle according to claim 7, wherein
when the numerator given by the second order expression of the model is denoted by $A \cdot s^2 + B \cdot s + C$, the first attenuation coefficient denoted $\xi z$ is obtained by an expression given by $$\frac{B}{A} = 2\sqrt{\frac{C}{A}} \cdot \xi z,$$

and when the second attenuation coefficient denoted by $\xi c$ is in a range meeting $\xi z < \xi c \leq 1$, the transmission characteristic of the filter meets the following expression:

$$Gz = \frac{A \cdot s^2 + B \cdot s + C}{s^2 + 2\sqrt{\frac{C}{A}} \times \varsigma c \cdot s + \frac{C}{A}}$$

where Gz denotes the transmission characteristic of the filter.

9. The controller of the electric vehicle according to claim 7, further comprising:
a phase compensator for correcting a phase at a to-be-controlled frequency,
wherein the phase compensator implements a phase compensation of the second torque target value subjected to the third filtering treatment by the filter.

10. The controller of the electric vehicle according to claim 9, further comprising:
a gain compensator for correcting a gain at the to-be-controlled frequency,
wherein the gain compensator implements a gain compensation of the second torque target value subjected to the third filtering treatment by the filter.

11. The controller of the electric vehicle according to claim 7, wherein
the first paragraph calculator calculates the first paragraph of the second torque target value, based on an addition) which is obtained by the following calculation:
adding a difference between:
the first paragraph of the second torque target value, and
the second paragraph of the second torque target value
to the first torque target value which is set by the torque target value setter.

12. The controller of the electric vehicle according to claim 7, wherein
the first paragraph calculator and the second paragraph calculator make variable the frequency characteristic at the transmission characteristic having the band pass filter characteristic, to thereby correct the phase at the to-be-controlled frequency.

13. A method of controlling an electric vehicle having as a power source an electric motor driven based on a torque command value, the controlling method comprising:
sensing vehicle information;
setting a first torque target value based on the vehicle information;
calculating the torque command value to the electric motor;
calculating a first paragraph of a second torque target value by implementing a first filtering treatment of the torque command value, the first filtering treatment including a transmission characteristic having a band pass filter characteristic;
calculating a second paragraph of the second torque target value by implementing a second filtering treatment of a motor revolution speed which is one of pieces of the vehicle information, the second filtering treatment including:
a transmission characteristic having the band pass filter characteristic, and
a model of a transmission characteristic between:
a torque input to the vehicle, and
the motor revolution speed;
calculating the second torque target value based on a deviation between:
the first paragraph of the second torque target value, and
the second paragraph of the second torque target value, wherein
the model includes a numerator given by a second order expression and a denominator given by a third order expression,
the second torque target value calculating operation includes:
subtracting the second paragraph of the second torque target value from the first paragraph of the second torque target value, and
outputting the second torque target value by implementing a third filtering treatment of an output value of the subtracting operation, the third filtering treatment including a transmission characteristic including a numerator given by a second order expression and a denominator given by a second order expression,
the transmission characteristic of the outputting operation includes:
the numerator which is given by the second order expression of the numerator of the model, and
the denominator which is given by the second order expression having a second attenuation coefficient, the second attenuation coefficient being set larger than a first attenuation coefficient calculated from the numerator of the model and being set less than or equal to 1, and
the torque command value calculating calculates the torque command value based on:
the first torque target value, and
the second torque target value subjected to the third filtering treatment by the outputting operation.

14. A controller of an electric vehicle having as a power source an electric motor driven based on a torque command value, the controller comprising:
a sensing means for sensing vehicle information;
a torque target value setting means for setting a first torque target value based on the vehicle information;
a torque command value calculating means for calculating the torque command value to the electric motor;
a first paragraph calculating means for calculating a first paragraph of a second torque target value by implementing a first filtering treatment of the torque command value, the first filtering treatment including a transmission characteristic having a band pass filter characteristic;
a second paragraph calculating means for calculating a second paragraph of the second torque target value by implementing a second filtering treatment of a motor revolution speed which is one of pieces of the vehicle information, the second filtering treatment including:
a transmission characteristic having the band pass filter characteristic, and
a model of a transmission characteristic between:
a torque input to the vehicle, and
the motor revolution speed;
a torque target value calculating means for calculating the second torque target value based on a deviation between:
the first paragraph of the second torque target value, and
the second paragraph of the second torque target value, wherein
the model includes a numerator given by a second order expression and a denominator given by a third order expression,
the torque target value calculating means includes:
a subtracting means for subtracting the second paragraph of the second torque target value from the first paragraph of the second torque target value, and a filtering means for outputting the second torque target value by implementing a third filtering treatment of an output value of the subtractor, the third filtering treatment including a transmission characteristic including a numerator given by a second order expression and a denominator given by a second order expression, the transmission characteristic of the filtering means includes:

the numerator which is given by the second order expression of the numerator of the model, and the denominator which is given by the second order expression having a second attenuation coefficient, the second attenuation coefficient being set larger than a first attenuation coefficient calculated from the numerator of the model and being set less than or equal to 1, and the torque command value calculating means calculates the torque command value based on:

the first torque target value, and the second torque target value subjected to the third filtering treatment by the filtering means.

* * * * *